United States Patent
Pawlowski et al.

(10) Patent No.: US 11,061,742 B2
(45) Date of Patent: Jul. 13, 2021

(54) SYSTEM, APPARATUS AND METHOD FOR BARRIER SYNCHRONIZATION IN A MULTI-THREADED PROCESSOR

(71) Applicant: Intel Corporation, Santa Clara, CA (US)

(72) Inventors: Robert Pawlowski, Portland, OR (US); Ankit More, San Francisco, CA (US); Shaden Smith, Mountain View, CA (US); Sowmya Pitchaimoorthy, Hillsboro, OR (US); Samkit Jain, Hillsboro, OR (US); Vincent Cavé, Hillsboro, OR (US); Sriram Aananthakrishnan, Portland, OR (US); Jason M. Howard, Portland, OR (US); Joshua B. Fryman, Corvallis, OR (US)

(73) Assignee: INTEL CORPORATION, Santa Clara, CA (US)

( * ) Notice: Subject to any disclaimer, the term of this patent is extended or adjusted under 35 U.S.C. 154(b) by 52 days.

(21) Appl. No.: 16/019,685

(22) Filed: Jun. 27, 2018

(65) Prior Publication Data

US 2020/0004602 A1 Jan. 2, 2020

(51) Int. Cl.
G06F 9/52 (2006.01)
G06F 9/30 (2018.01)
G06F 9/38 (2018.01)

(52) U.S. Cl.
CPC ......... *G06F 9/522* (2013.01); *G06F 9/30087* (2013.01); *G06F 9/3869* (2013.01)

(58) Field of Classification Search
CPC .......... G06F 9/522; G06F 9/46; G06F 9/3009; G06F 9/38; G06F 9/30087; G06F 9/3869
See application file for complete search history.

(56) References Cited

U.S. PATENT DOCUMENTS

| | | | |
|---|---|---|---|
| 7,100,021 B1 * | 8/2006 | Marshall | G06F 9/52 712/19 |
| 7,937,709 B2 | 5/2011 | Kottapalli et al. | |
| 2010/0110089 A1 * | 5/2010 | Paltashev | G06T 1/20 345/522 |
| 2012/0179896 A1 | 7/2012 | Salapura et al. | |

(Continued)

OTHER PUBLICATIONS

Europeant Patent Office, Search Report dated Oct. 30, 2019 in application No. 191775809.3-1221, 14 pages.

(Continued)

*Primary Examiner* — Dong U Kim
(74) *Attorney, Agent, or Firm* — Trop, Pruner & Hu, P.C.

(57) ABSTRACT

In one embodiment, a first processor core includes: a plurality of execution pipelines each to execute instructions of one or more threads; a plurality of pipeline barrier circuits coupled to the plurality of execution pipelines, each of the plurality of pipeline barrier circuits associated with one of the plurality of execution pipelines to maintain status information for a plurality of barrier groups, each of the plurality of barrier groups formed of at least two threads; and a core barrier circuit to control operation of the plurality of pipeline barrier circuits and to inform the plurality of pipeline barrier circuits when a first barrier has been reached by a first barrier group of the plurality of barrier groups. Other embodiments are described and claimed.

18 Claims, 17 Drawing Sheets

(56) References Cited

U.S. PATENT DOCUMENTS

| | | | |
|---|---|---|---|
| 2012/0304194 A1* | 11/2012 | Engh-Halstevdt | G06F 9/4881 718/106 |
| 2014/0007111 A1* | 1/2014 | Targowski | G06F 9/522 718/102 |
| 2014/0130052 A1* | 5/2014 | Lin | G06F 9/38 718/102 |
| 2014/0282566 A1* | 9/2014 | Lindholm | G06F 9/522 718/102 |
| 2015/0006849 A1* | 1/2015 | Xu | G06F 15/17325 712/30 |
| 2015/0095542 A1* | 4/2015 | Knies | G06F 13/4068 710/305 |
| 2016/0321777 A1* | 11/2016 | Jin | G06F 9/5016 |
| 2017/0153896 A1 | 6/2017 | Mathew | |
| 2019/0121680 A1* | 4/2019 | Wilkinson | G06F 9/30123 |

OTHER PUBLICATIONS

Liqun Cheng, et al., "Fast Barriers for Scalable ccNUMA Systems," Jun. 14, 2005, 10 pages.

* cited by examiner

SYSTEM, APPARATUS AND METHOD FOR BARRIER SYNCHRONIZATION IN A MULTI-THREADED PROCESSOR

TECHNICAL FIELD

Embodiments pertain to synchronization of multiple threads.

BACKGROUND

As data sets grow and applications take advantage of parallelism in workloads and algorithms, massive multi-threaded machines become a higher possibility as a proper solution. With a multi-threaded programming model, synchronization between threads becomes an issue. To maintain synchronization, a programmer can implement barriers in code. When a thread reaches a barrier, it waits until all other participating threads also reach the barrier, at which point the thread can proceed. Barriers have a number of practical uses, ranging from step points during debug to allowing for algorithmic partitioning in applications.

Typical approaches to barrier synchronization include both software and hardware techniques. The basic software approach is to have each thread atomically increment a counter value in memory, check the counter value, and if the count has not been reached, the thread waits. Once the counter value equals the number of threads participating in the barrier, a flag is set that is observed by all threads. At this point, all threads proceed forward. Hardware implementations range from connecting wires between processors to transmit a single barrier signal to creating an algorithmic tree structure between processors to send barrier packets over a network in a more performance efficient manner. While these techniques may be practical for a limited number of threads, they do not scale to larger numbers of threads.

DETAILED DESCRIPTION

In various embodiments, a processor is provided with hardware circuitry to enable hardware management of barriers. With this barrier circuitry, synchronization operations may be performed efficiently in hardware. As described herein, a given core may have a hierarchical arrangement of barrier hardware circuits including pipeline barrier circuits and at least one core barrier circuit. With this arrangement, a core may be configured with at least two levels of barrier circuits. Of course in other embodiments, more than two levels of barrier circuits may be present. These barrier hardware circuits also may be referred to herein as so-called "collective engines." In a particular embodiment a core may include one or more pipeline collective engines associated with corresponding pipelines of the core and a core collective engine coupled to these individual pipeline collective engines.

With distributed barrier management operation as described herein, a programmer can configure concurrent barriers for multiple groups of threads to be managed by these collective engines. In turn, these configured collective engines enable the threads to synchronize efficiently at barrier points with low latency, reduced communication and minimal complexity. In embodiments, a programmer may configure these collective engines with information including a count of participating threads and programmability of a response mechanism (e.g., a push or poll mode). Furthermore, by providing configurability as described herein, this hardware circuitry can support multiple concurrent barriers with any number of thread participants for each concurrent barrier. In addition, embodiments enable cross-core barrier synchronization by leveraging this hardware circuitry throughout multiple cores, e.g., of a multicore processor. Embodiments may further extend to a processor socket, including multiple dies each having one or more cores to enable cross-socket barrier synchronization. And still further embodiments enable extension of the techniques herein to one or more processing nodes each formed of one or more sockets to enable cross-node barrier synchronization as well.

Figure 1:
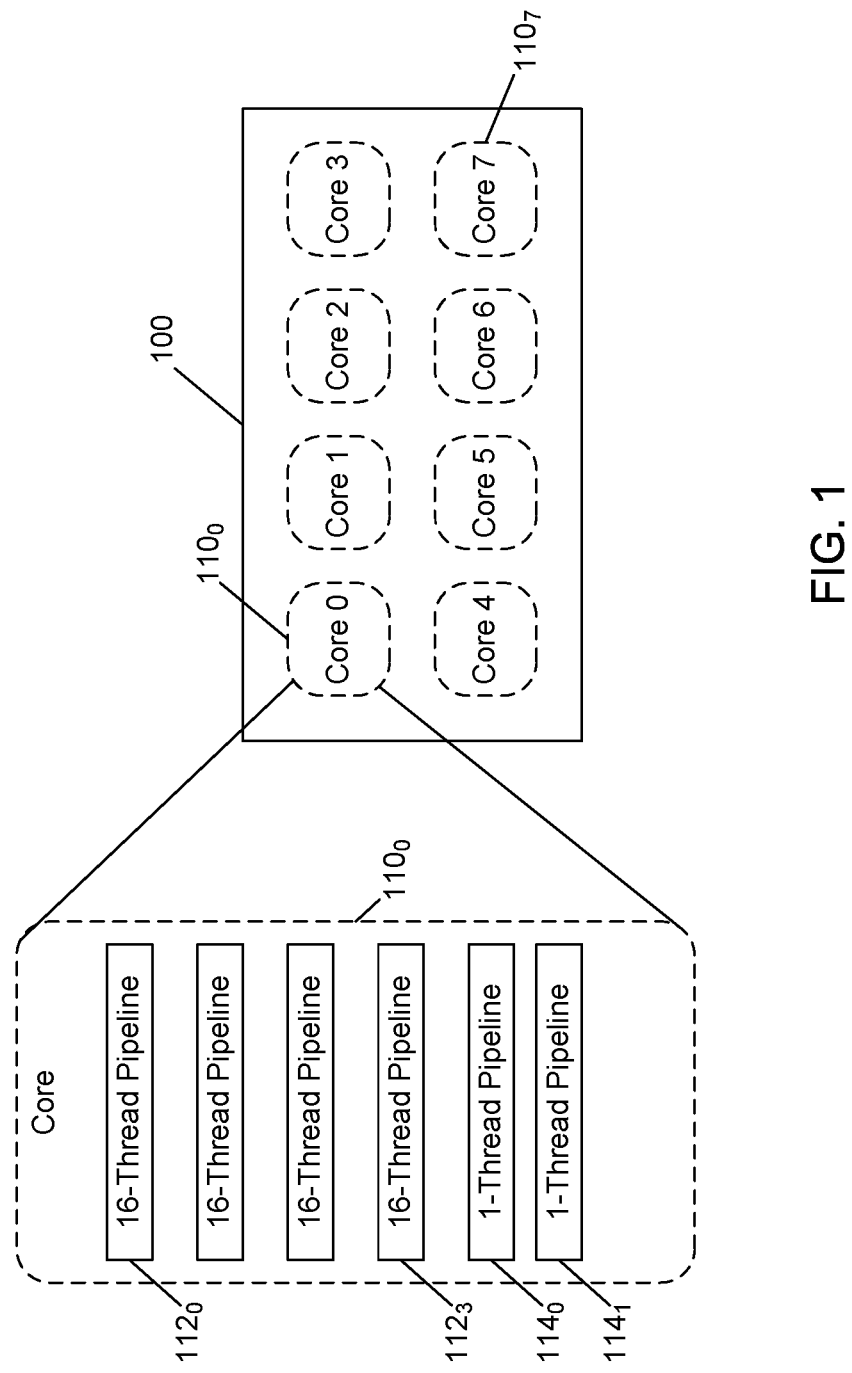
FIG. 1 is a block diagram of a processor in accordance with an embodiment of the present invention.

Referring now to FIG. 1, shown is a block diagram of a processor in accordance with an embodiment of the present invention. More specifically as shown in FIG. 1, processor 100 is a multicore processor, implemented with a single semiconductor die. Understand while a single semiconductor die is shown for purposes of illustration in FIG. 1, embodiments are not limited in this aspect. In other cases, multicore processors may be implemented in integrated circuit packages having multiple semiconductor dies. As shown in FIG. 1, processor 100 includes a plurality of cores $110_0$-$110_7$. Although 8 cores are shown for purposes of illustration, embodiments of a multicore processor can include more or fewer individual cores. Embodiments may be used in connection with many different core types, including in-order processors and out-order processors of many different architectures, including reduced instruction set computing (RISC) and complex instruction set computing (CISC) processor types, among others. In one example, processor 100 may be a programmable unified memory architecture (PUMA)-based system that may be implemented as a many-threaded processor.

In the particular example shown in FIG. 1, each core 110 may support up to 66 hardware threads. Of course understand the scope of the present invention is not limited in this regard, and more or fewer hardware threads can be supported in other embodiments. In a particular embodiment, a processor such as processor 100, having eight cores 110 per die may be implemented into a socket having, e.g., 32 dies. In turn, a plurality of sockets, e.g., 16, may be implemented within a processor node. With a hierarchical configuration of a system arranged in this manner, over 256,000 threads per node may occur. Particularly with a multi-node system, embodiments may enable efficient barrier synchronization operations.

While a system having multiple processors 100 may be used for many different types of workloads, in one example embodiment a system may be used for large-scale graph applications. Such applications may be partitioned to run on subsets of threads. For example, in a page rank algorithm, during each iteration every vertex recalculates its own importance values based on previous values push to it by its neighbors. At the end of the iteration, all vertices atomically push their respective values to their neighbors.

To ensure that all vertices have received the most recent values from their neighbors prior to beginning a next iteration, a barrier may be placed at the end of each iteration for all neighboring vertices. In different implementations, the scale of such neighboring vertices may range from single digits to thousands. In a case in which each vertex is implemented as a thread, embodiments may provide barrier synchronization techniques that can be efficient for a small number of local threads (executing on the same core) and for larger number of threads that execute across various nodes of a system.

As shown in the inset of FIG. 1, details of a representative core $110_0$ are shown. As illustrated, core $110_0$ includes a plurality of processor pipelines. Understand that such pipelines may take many different forms. For purposes of illustration, a plurality of multi-threaded pipelines $112_0$-$112_3$ are shown, along with single threaded pipelines $114_0$-$114_1$. In various embodiments, pipelines 112, 114 may include various circuitry including front end circuitry to fetch and decode instructions, execution circuitry to execute such instructions, and back end circuitry, such as retirement circuitry to retire executed instructions and commit results to a context of the processor. Understand while pipelines 112 are illustrated as 16-thread pipelines, embodiments apply equally to other multi-thread pipelines, including two, four or eight-thread pipelines, as examples. While shown at this high level in the embodiment of FIG. 1, many variations and alternatives are possible.

Figure 2:
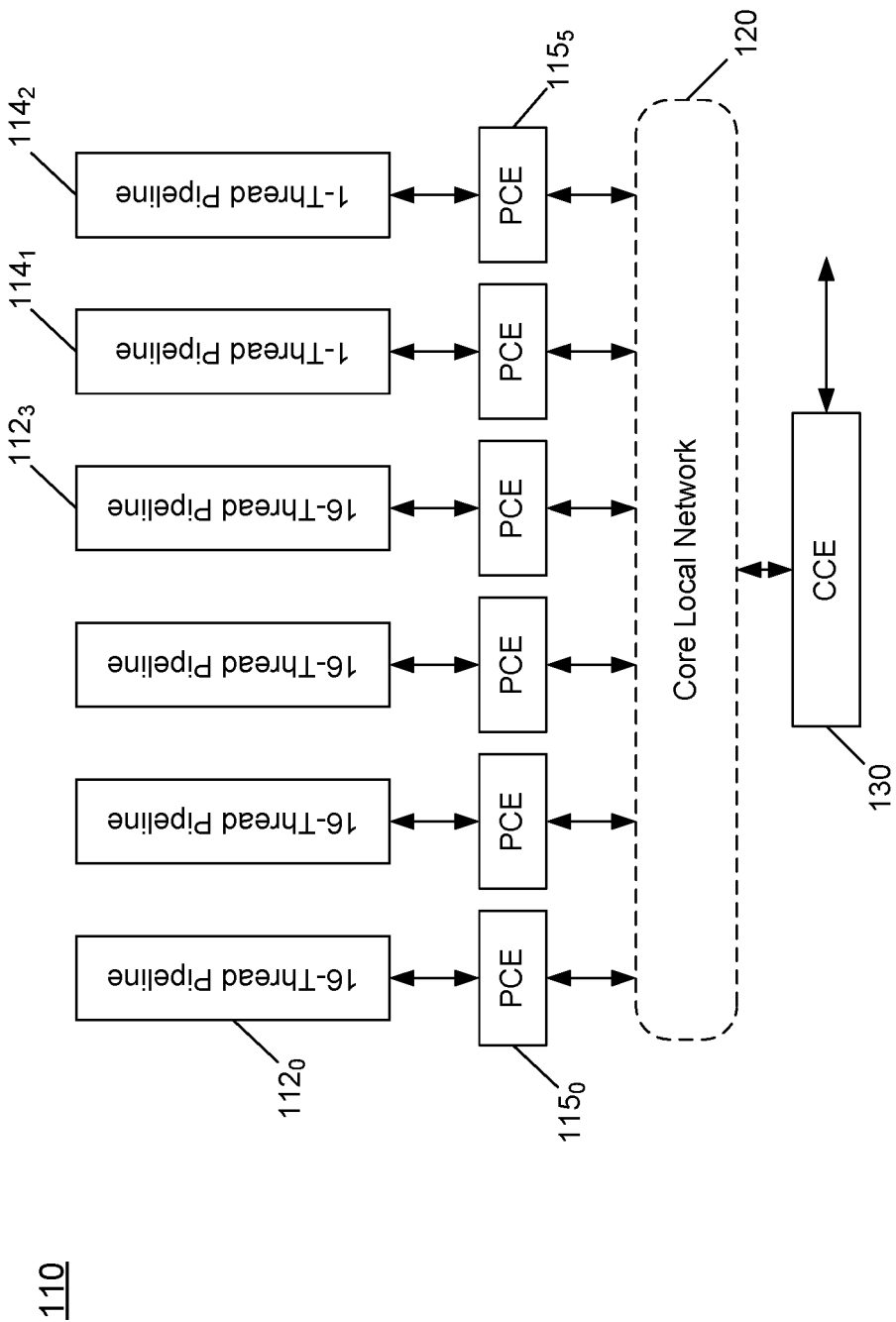
FIG. 2 is a block diagram of a processor core in accordance with an embodiment of the present invention.

Referring now to FIG. 2, shown is a block diagram of a processor core in accordance with an embodiment of the present invention. As shown in FIG. 2, processor core 110 includes a plurality of pipelines 112, 114. In addition, core 110 includes hardware to perform efficient barriers as described herein. More specifically as shown, each pipeline 112, 114 is associated with a corresponding one of a plurality of pipeline collective engine (PCEs) $115_0$-$115_5$. In embodiments, these collective engines, which may be implemented in hardware, provide close coupling between a corresponding pipeline and the collective engine. In this way, low latency reporting of barrier status can occur with low overhead.

As further illustrated in FIG. 2, to enable communication of barrier status information amongst PCEs 115 and other circuitry, PCEs 115 may be in communication with a core collective engine (CCE) 130 via a core local network 120. In an embodiment, local network 120 may be implemented as a crossbar, fabric or so forth.

In embodiments, CCE 130 may be implemented as a master hardware circuit for performing efficient barrier synchronization operations as described herein. To this end, embodiments provide techniques to enable programming and configuration of CCE 130 for a desired mode of operation. In turn, CCE 130 may configure PCEs 115 based on the mode of operation. Then during normal operation, as barriers are programmed and reached during execution, status information may be communicated between PCEs 115 and CCE 130 (and vice-versa) to monitor the status of different barrier operations. Furthermore, CCE 130 may control synchronization operations when all threads of a given barrier group have reached a programmed synchronization barrier. For barriers that exist only between threads at a pipeline or core level, the highest priority is to provide synchronization as efficiently as possible. To do this, barrier groups can be tracked at each level of the hierarchy using collective engines. More specifically as shown in FIG. 2, each pipeline 112, 114 has a corresponding PCE 115 to provide fast responses to poll instructions. In turn at the core level, CCE 130 is configured to synchronize between the pipelines.

PCEs 115 and CCE 130 have the ability to track multiple barrier ID's. If different groups of threads have barrier operations occurring, all can be tracked concurrently. For example, eight different thread groups can all exist and be referenced with unique barrier ID's by the programmer. Assuming no software-created dependencies, there is no hardware dependency between barrier groups and all can be serviced in parallel.

Note further CCE 130 may communicate with other cores. More particularly, CCE 130 may communicate, e.g., via dedicated links, with CCEs of other cores. Note that the communications between pipelines 112, 114 and PCEs 115 may be via dedicated interconnects that are separate from primary communication channels between pipelines and other core circuitry. However understand that local network 120 may be a shared interconnect structure such as a system fabric. Understand while shown at this high level in the embodiment of FIG. 2, many variations and alternatives are possible.

To expose barrier functionality to the programmer, special machine instructions may be provided in an instruction set architecture (ISA). Referring now to Table, 1 shown are example barrier instructions in accordance with an embodiment. As seen, each of these instructions include an argument of the barrier configuration ID. The barrier.init instruction indicates that a thread has met the barrier. In an embodiment, a thread may execute a barrier.init instruction, which causes the thread to send a completion notification to its corresponding PCE, which in turn may communicate the same status information to a CCE. The barrier.wait and barrier.poll instructions allow threads to check the status in either a blocking or non-blocking manner, respectively. In an embodiment, a thread may execute the barrier.wait instruction to wait until it receives notification that all threads have reached the barrier before making forward progress. Thus, this instruction operates to block a thread until the synchronization has successfully occurred. And in turn, a thread may execute the barrier.poll instruction to poll its PCE for status information to indicate that all threads have reached the barrier point and a synchronization has successfully occurred. With this non-blocking instruction, the thread may execute instructions unrelated to the barrier until all threads reach the barrier point.

TABLE 1

| Instruction | ASM form arguments | Description |
| --- | --- | --- |
| barrier.init | r1 | r1-barrier ID |
| barrier.wait | r1 | r1-barrier ID |
| barrier.poll | r1, r2 | r1-barrier ID, r2-register to receive status |

Configurability of participants may be provided through targeted stores to machine specific registers (MSRs), e.g., present in the corresponding collective engines. These MSRs exist in the address map of the system, and each PCE and CCE has MSR space available to support multiple different collective configurations. Each subset of the MSR space corresponds to a unique configuration or barrier ID. In an embodiment, a configuration operation may be performed that includes individual store instructions to the CCE MSR to set the number of participating threads in the core, the poll/push return mode, and enabling the operation. The MSRs in the CCE associated with each barrier operation are shown in Table 2.

TABLE 2

| Name | Description | Software R/W? |
| --- | --- | --- |
| ENABLE | Barrier.init instructions will be accepted. | R/W |
| DONE | Instruction in this MSR thread is done. | R |
| MODE | Push-mode or poll-mode? | R/W |
| CONFIG_COUNT | User-defined count of participating threads. | R/W |
| ACTIVE_COUNT | Active running count of threads who have reached the barrier. | R |

As illustrated in Table 2, multiple fields may be present in a given MSR to enable storage of bits or indicators including: an enable indicator to enable the collective engine is ready to receive incoming barrier.init instructions; a done indicator to indicate whether the given barrier ID is ready to begin a next operation; and a mode indicator to indicate whether status information is to be communicated according to a push mode or a poll mode. As further illustrated, the MSR may include fields to store a configuration count corresponding to a user-defined count of number of participating threads and an active count that provides a tally of threads that have reached the barrier.

In an embodiment, a PCE may be differently configured, and include only a subset of these MSRs, as shown in Table 3.

TABLE 3

| Name | Description | Software R/W? |
| --- | --- | --- |
| ENABLE | Barrier.init instructions will be accepted. | R/W |
| DONE | Instruction in this MSR thread is done. | R |
| MODE | Push-mode or poll-mode? | R/W |

As illustrated in Table 3, in an embodiment pipeline collective engines may include the same enable, done, and mode fields as present in a core collective engine, but not include the count fields, in implementations in which counts are maintained at the core collective engine level. In other cases, understand that a PCE may include these count fields to maintain local count information, which then can be passed to the core collective engine.

To begin configuration of the barrier, a program is configured to first execute a directed store to the CONFIG_COUNT, LOCAL_ENABLE, and MODE fields of one or more CCE MSRs. The count is set so that the CCE can determine when all participants have reached the barrier. The ENABLE bit indicates whether the core collective engine is properly configured and ready to accept barrier.init instructions from threads. The MODE bit is used to identify whether operation is according to a push or poll barrier notification method.

Once the count MSRs are configured, participating threads call into the CCE using a 'barrier.init' machine instruction detailed in Table 1, when the thread reaches the barrier. For each 'barrier.init' instruction that the CCE receives, it increments the ACTIVE_COUNT. When the ACTIVE_COUNT equals the CONFIG_COUNT, the CCE responds to each PCE with an indication that the barrier has been reached by all participants.

Instead if the notification method is configured as a push, the CCE sends an alert via an interrupt mechanism that the operation with the assigned barrier ID has been completed. If the notification method has been configured as a poll method, the participating threads may periodically send 'barrier.poll' instructions to the local PCE. Because the PCE is aware of the status via its own internal MSR status (e.g., via the DONE MSR field), it can respond quickly to such poll inquiries. Once the barrier has been reached by all participants, for each successful poll the PCE alerts the CCE, which then decrements the ACTIVE_COUNT. Once the count returns to zero, the CCE de-asserts its DONE register and alerts the PCE to de-assert theirs as well. At this point the barrier ID slot is ready to begin the next operation. In an embodiment, the CONFIG_COUNT and ENABLE MSRs are not reset, allowing the programmer to use the same barrier ID without any re-configuration.

Figure 3:
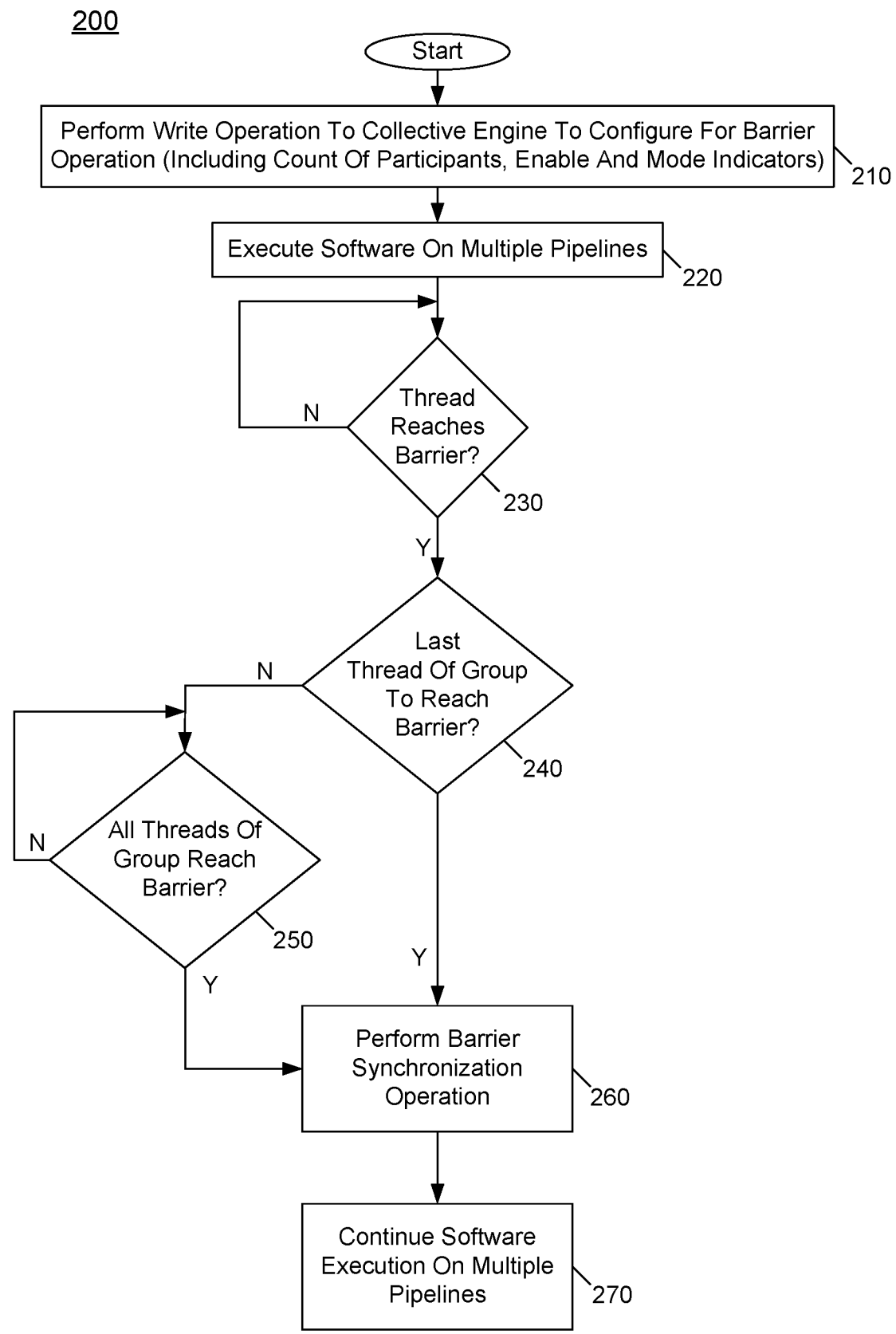
FIG. 3 is a flow diagram of a method in accordance with an embodiment of the present invention.

Referring now to FIG. 3, shown is a flow diagram of a method in accordance with an embodiment of the present invention. More specifically, method 200 shown in FIG. 3 is a method for performing barrier operations in accordance with an embodiment. As such, method 200 may be performed by hardware circuitry, firmware, software and/or combinations thereof. In a particular embodiment, method 200 may be used to perform configuration operations to program one or more collective engines and then to enable software execution to proceed within a processor programmed for efficient barrier synchronization operations.

As illustrated, method 200 begins by performing a write operation to a collective engine (block 210). More specifically, this write operation may be a directed write operation to a core collective engine to configure it for a barrier operation. For purposes of discussion herein, understand that this directed write may include various configuration information, including a count of participants and various indicators, such as enable and mode indicators. The count of participants is an indication of the number of threads for a given barrier operation. Such group of threads may be identified with a barrier identifier (ID). More specifically, the synchronization hardware described herein may provide support for N different barrier IDs, concurrently enabling barrier synchronizations to proceed for N different thread groups. Each thread group may be formed of two or more threads, with different groupings of threads possible.

In response to this write operation, a core collective engine may configure itself, e.g., by writing the various configuration information within one or more MSRs of the CCE. In turn, the CCE may provide at least portions of this configuration information to the present PCEs. Note in embodiments, the CCE may send this configuration information to all PCEs, as with thread migration in which software can move threads amongst the pipelines, all PCEs may be called upon to access this information. At this point, the hierarchical barrier management hardware is configured and ready for normal execution.

Thus as further illustrated in FIG. 3, software may execute on multiple pipelines (block 220). This software is multi-threaded software such that different threads may execute on one or more pipelines. During operation it may be determined whether a given thread reaches a barrier (diamond 230). In one embodiment, this determination may be in response to a given thread reaching a predetermined instruction that indicates reaching of the barrier, namely a barrier-.init instruction. Otherwise if a thread has not reached the barrier, it continues normal execution of instructions.

When it is determined that a thread reaches a barrier, next control passes to diamond 240 to determine whether this thread is the last thread of its group to reach the barrier. As will be described herein, this determination may proceed with low latency via the hierarchical hardware arrangement of collective engines. If this thread is not the last thread of its group to reach the barrier, control passes to diamond 250 to determine whether all threads of the group have reached the barrier. Understand that this determination may proceed, in some embodiments at least, in a non-blocking manner, such that the thread may continue to execute code and loop back for this determination, e.g., according to a predetermined schedule.

As further shown in FIG. 3, at block 260 once all threads have reached the barrier, a barrier synchronization operation may be performed. In one embodiment, the barrier synchronization operation may include confirming that all threads have reached the barrier, allowing the threads to proceed with further code execution, and clearing state within the barrier synchronization hardware associated with the reached barrier. Thereafter, software may continue execution following the barrier at block 270. Understand while shown at this high level in the embodiment of FIG. 3, embodiments are not limited in this regard.

Figure 4:
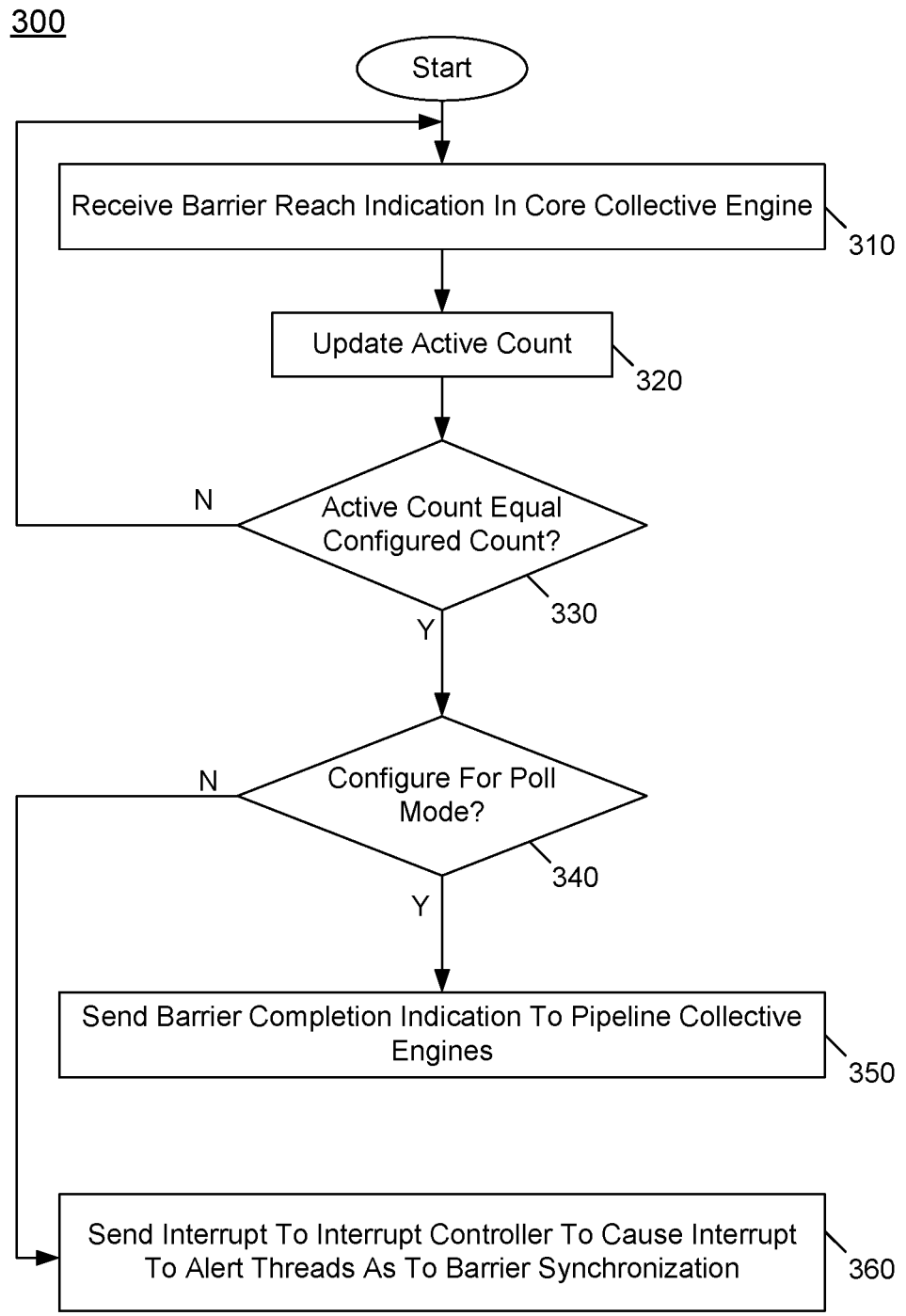
FIG. 4 is a flow diagram of a method in accordance with another embodiment of the present invention.

Referring now to FIG. 4, shown is a flow diagram of a method in accordance with another embodiment of the present invention. More specifically as shown in FIG. 4, method 300 is a method for performing a barrier operation within a core collective engine in accordance with an embodiment. As such, method 300 may be performed by hardware circuitry, firmware, software and/or combinations thereof.

In a particular embodiment, a CCE may execute method 300. As illustrated, method 300 begins by receiving a barrier reach indication in a core collective engine (block 310). Understand that this barrier reach indication is issued to indicate that a given thread executed on a pipeline associated with a pipeline collective engine has reached the barrier. Next, at block 320 the CCE may update an active count. This active count is a number of threads that have reached the barrier point. Control next passes to diamond 330 to determine whether the active count equals the configured count. In an embodiment, this configured count is stored in an MSR of the CCE that indicates the number of threads for the given thread group.

If it is determined at diamond 330 that the active count does not equal the configured count, control passes back to block 310, discussed above. Otherwise, when the active count equals the configured count, this is an indication that all threads have successfully reached the barrier. At this point, the CCE may perform further operations to notify the threads of the barrier group that the barrier has been reached, and thus a successful barrier synchronization has occurred.

Depending upon the configured mode, this notification may be by way of a push mode or a poll mode. As such, control next passes to diamond 340 to determine whether the CCE is configured for poll mode. If so, control passes to block 350 where a barrier completion indication may be sent to the pipeline collective engines so that they may inform the various threads of the group with low latency that all threads have successfully reached the barrier. In this poll mode, in turn PCEs that receive this barrier completion indication may provide the same status information to given threads, when requested by a poll request from the threads.

Still with reference to FIG. 4, if it is determined that the CCE is configured for a push mode of operation, control instead passes to block 360. At block 360 the CCE may send an interrupt to an interrupt controller. More specifically, this interrupt indicates successful barrier completion, which in turn causes an interrupt handler to execute to alert the threads as to the barrier synchronization. In one embodiment the interrupt handler may interact with the CCE or PCEs to perform any barrier related or post-barrier related actions, if necessary. In another embodiment the interrupt handler may act on software state to perform appropriate barrier or post-barrier related actions. Yet another embodiment may rely on a hybrid solution formed of these two approaches. Understand while shown at this high level in the embodiment of FIG. 4, many variations and alternatives are possible.

Figure 5:
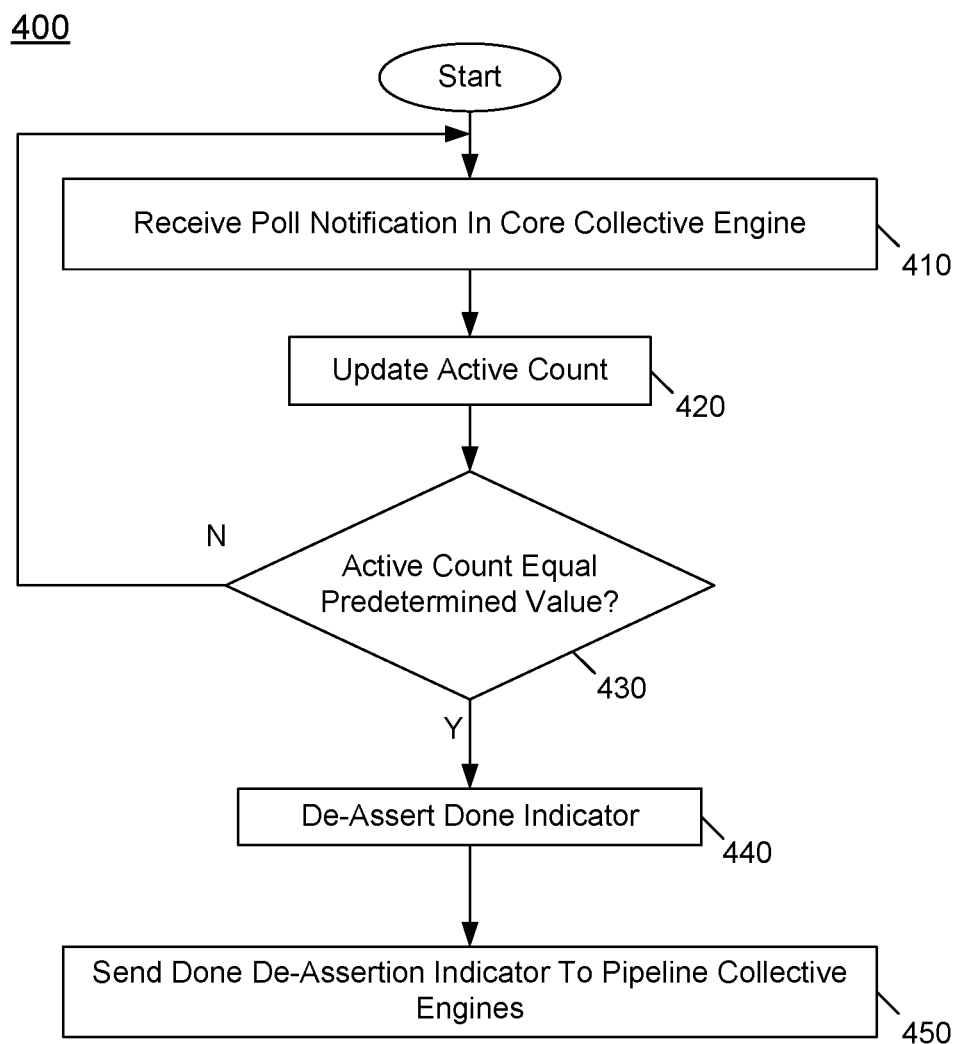
FIG. 5 is a flow diagram of a further method in accordance with another embodiment of the present invention.

Referring now to FIG. 5, shown is a flow diagram of a method in accordance with yet another embodiment of the present invention. More specifically as shown in FIG. 5, method 400 is a method for performing a barrier operation within a core collective engine in accordance with another embodiment. As such, method 400 may be performed by hardware circuitry, firmware, software and/or combinations thereof.

In a particular embodiment, a CCE may execute method 400. As illustrated, method 400 begins by receiving a poll notification in a core collective engine (block 410). This poll notification is to indicate that a thread has polled its pipeline collective engine and has been notified that all threads have reached the barrier point. Next, at block 420 the CCE may update an active count, namely by decrementing this count. Control next passes to diamond 430 to determine whether the active count equals a predetermined value, e.g., zero.

If it is determined at diamond 430 that the active count does not equal this predetermined value, control passes back to block 410, discussed above. Otherwise, when the active count equals the predetermined value, this is an indication that all threads of the barrier group have been informed that all threads have successfully reached the barrier, and thus a successful barrier synchronization has occurred. As such, control next passes to block 440 where the done indicator is de-asserted and is sent to the pipeline collective engines at block 450 so they can free the corresponding barrier ID for this barrier group. Understand while shown at this high level in FIG. 5, the scope of the present invention is not limited in this regard.

Figure 6:
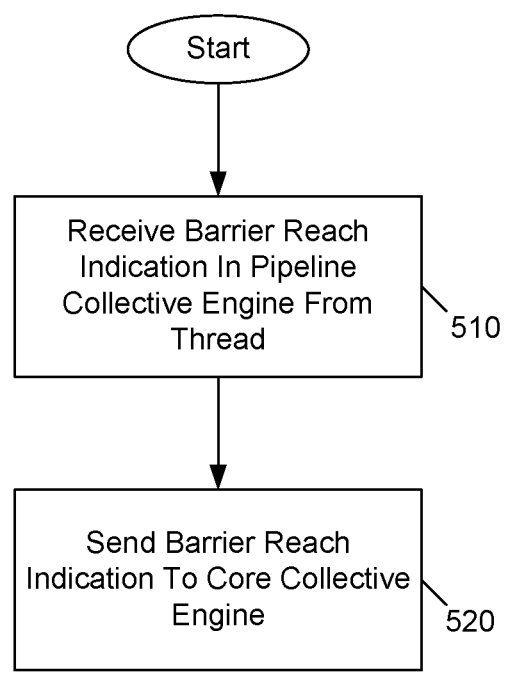
FIG. 6 is a flow diagram of a method in accordance with still another embodiment of the present invention

Referring now to FIG. 6, shown is a flow diagram of a method in accordance with still another embodiment of the present invention. As illustrated in FIG. 6, method 500 is a method for performing a barrier operation within a pipeline collective engine in accordance with an embodiment. As such, method 500 may be performed by hardware circuitry, firmware, software and/or combinations thereof.

During operation a thread may reach a barrier, e.g., when it executes a first barrier instruction (e.g., barrier.init). More specifically, this instruction is an indication to the thread that it has reached the barrier, namely the barrier associated with a given barrier ID of the first barrier instruction for the barrier group. In response to this first barrier instruction, the thread sends a barrier reach indication to its corresponding pipeline collective engine. Thus as illustrated in FIG. 6, the pipeline collective engine receives this barrier reach indication from the thread (block 510). Next, control passes to block 520 where the pipeline collective engine sends this barrier reach indication to the core collective engine (block 520). As described further above, the core collective engine may update (e.g., increment) an active count for this barrier ID based on this barrier reach indication. Note that at this point, the thread, in a non-blocking implementation, may continue execution of instructions unrelated to the barrier while it waits for other threads of the barrier group to reach the barrier and a barrier synchronization operation occurs. Also note that in an embodiment in response to receiving the barrier.init instruction, when the barrier ID MSRs in the CCE have not been properly configured and the PCE ENABLE indicator is not set, the PCE responds with an exception to the pipeline, indicating that software has performed an improper action. Understand while shown at this high level in the embodiment of FIG. 6, many variations and alternatives are possible.

Figure 7:
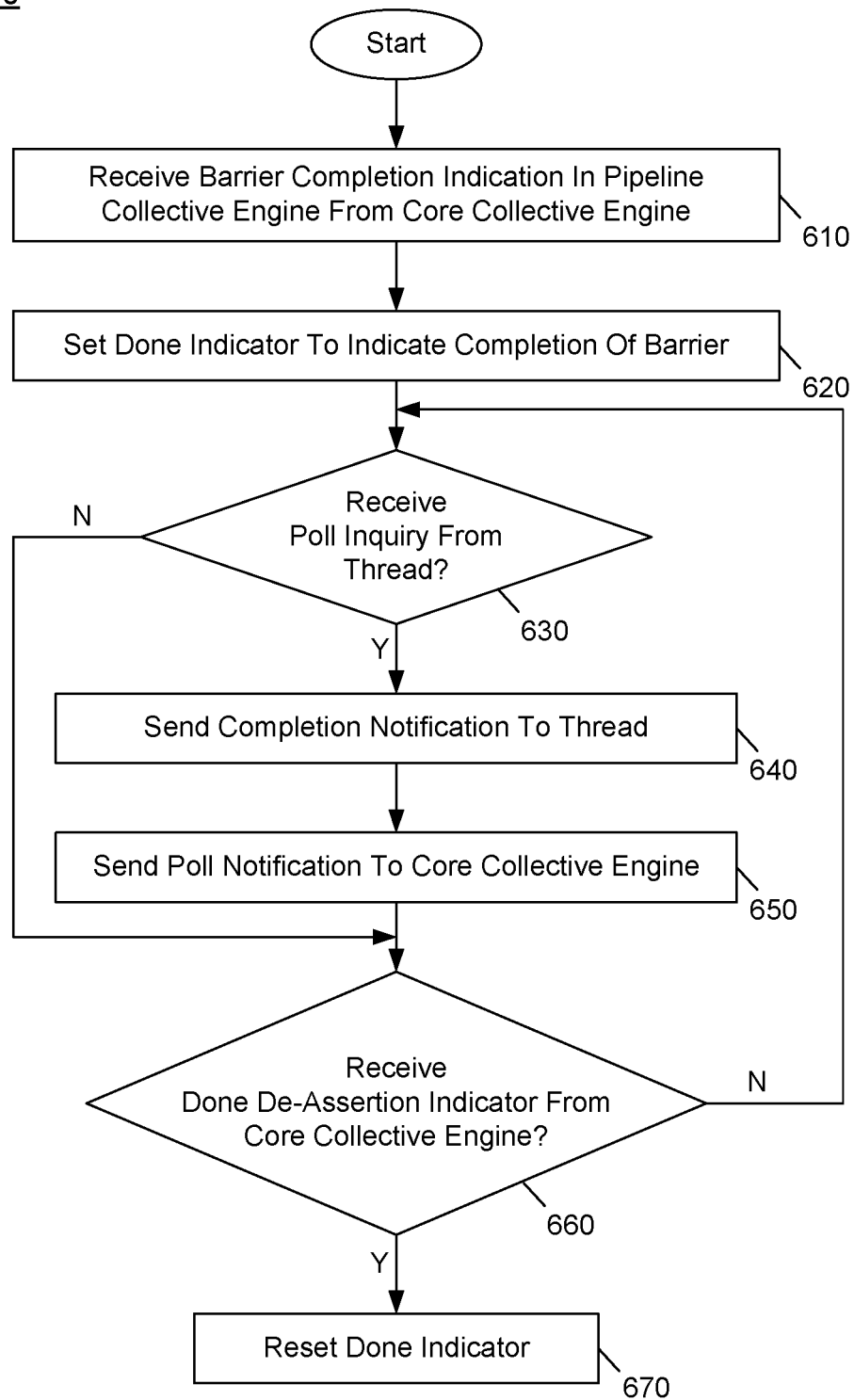
FIG. 7 is flow diagram of a method in accordance with yet another embodiment of the present invention.

Referring now to FIG. 7, shown is flow diagram of a method in accordance with yet another embodiment of the present invention. More specifically, method 600 of FIG. 7 is a method for performing barrier operations in a pipeline collective engine in accordance with an embodiment. As such, method 600 may be performed by hardware circuitry, firmware, software and/or combinations thereof.

As illustrated, method 600 begins by receiving a barrier completion indication in a PCE from the CCE (block 610). Understand that this barrier completion indication in method 600 may proceed in a poll mode of operation. In this poll mode, when a PCE receives this barrier completion indication, control passes to block 620 where it may set a done indicator, e.g., in a MSR of the PCE, to indicate completion of the barrier by all threads. More specifically, a given done indicator associated with the barrier ID of the received barrier completion indication may be set. Next control passes to diamond 630 to determine whether the PCE has received a poll inquiry from a given thread for this barrier ID. If so, control passes to block 640 where the PCE may send a completion notification to this thread. Understand that this completion notification may be sent with low latency, e.g., in a single clock cycle, owing to the tight coupling between PCE and pipeline. In addition to sending this completion notification to the thread, the PCE may further send a poll notification to the CCE (block 650). As described further above, the CCE may update (e.g., decrement) an active count for this barrier ID based on this poll notification.

Still with reference to FIG. 7, control next passes to diamond 660 (directly from diamond 630 or from block 650). At diamond 660 it is determined whether a done de-assertion indicator has been received from the CCE for this barrier ID. If not, control passes back to diamond 630 above. Instead, when this done de-assertion indicator is received, control passes to block 670 where the PCE may reset its done indicator. As such, at this point the barrier synchronization has completed and the given barrier ID may be re-used for another barrier operation. Understand while shown at this high level in the embodiment of FIG. 7, many variations and alternatives are possible.

Figure 8:
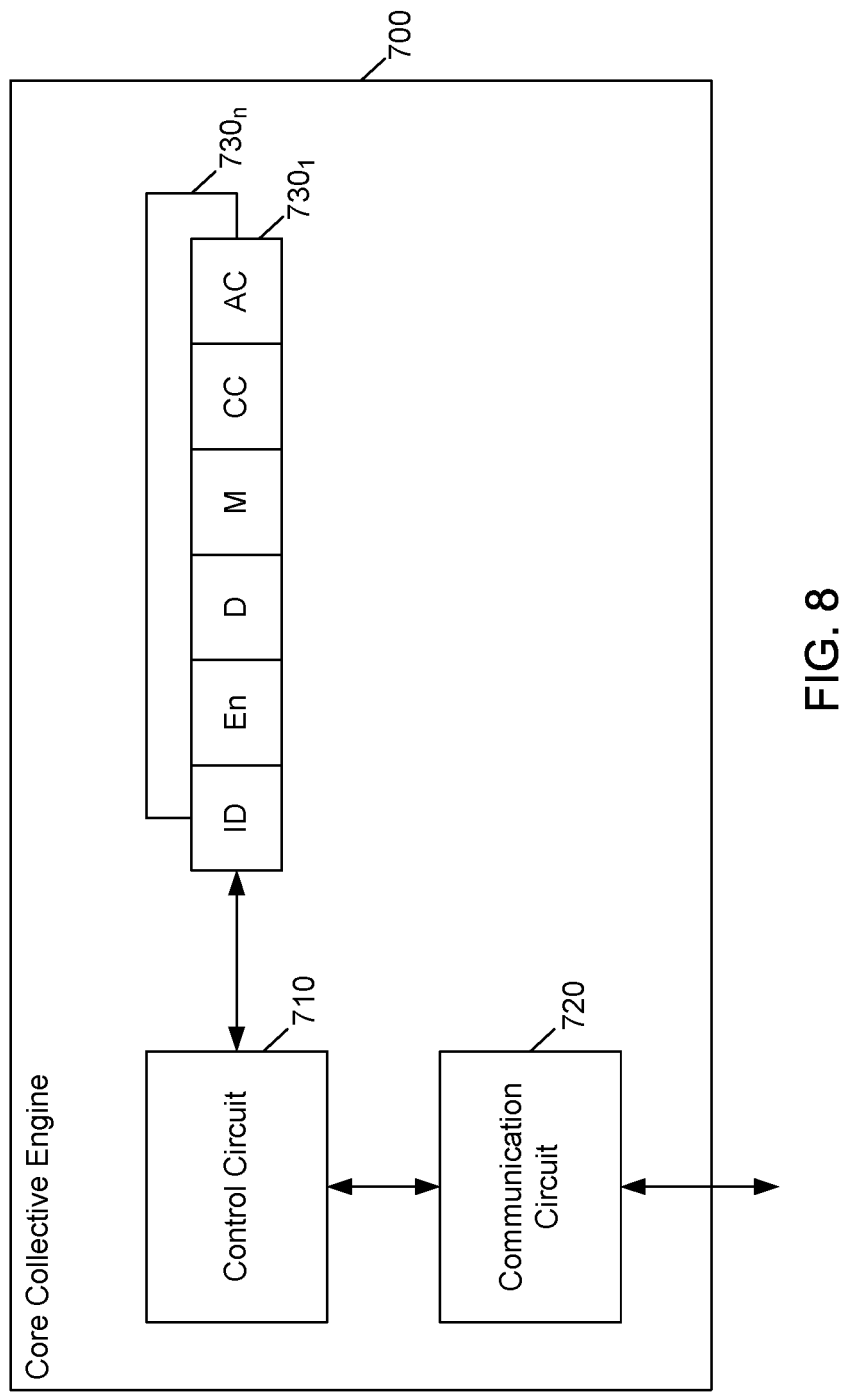
FIG. 8 is a block diagram of a core collective engine in accordance with an embodiment of the present invention.

Referring now to FIG. 8, shown is a block diagram of a core collective engine in accordance with an embodiment of the present invention. As shown in FIG. 8, core collective engine 700 is illustrated. Core collective engine 700 includes a control circuit 710 coupled to a communication circuit 720. By way of communication circuit 720, incoming information, including configuration information, status updates or so forth may be received. And similarly, communication circuit 720 may communicate, e.g., configuration information to configure pipeline collective engines and status information. Control circuit 710 may be configured to perform configuration operations and barrier synchronization operations as described herein. To this end, control circuit 710 may be configured to execute such operations as illustrated in FIGS. 3-7, in different embodiments.

Still with reference to FIG. 8, core collective engine 700 further includes a plurality of MSRs $730_1$-$730_n$ each to be used for synchronization operations for a given barrier ID. As illustrated, each MSR 730 includes a plurality of fields to store various information for purposes of performing hardware barrier management. As illustrated, these fields include a barrier ID field to indicate a given barrier group for the associated MSR, an enable field, a done field, a mode field, a configured count field, and an active count field. By way of the information stored in these fields, a particular barrier group may be configured, enabled, and controlled based on count information as described herein. Understand while shown at this high level in the embodiment of FIG. 8, many variations and alternatives are possible.

As discussed above, a hardware barrier circuit may be of hierarchical format with different barrier hardware circuits at multiple levels of a hierarchy. In FIG. 8, core collective engine 700 is a representative example of a core-level hardware barrier circuit. Understand that in some embodiments, barrier hardware circuits of other levels may be similarly configured or they may be implemented as a subset of the components in core collective engine 700. For example, in some embodiments pipeline collective engines may be implemented substantially the same as shown in FIG. 8, with the exception that lesser amounts of MSR fields and/or control circuitry is provided.

With hardware management of barriers as described herein, performance may be enhanced as compared to a software-only method of atomically incrementing a count value in memory. Furthermore, embodiments enable greater scalability than a single barrier signal that synchronizes multiple cores. With embodiments herein, the hardware-based barrier techniques disclosed may be scalable to thousands of threads, while remaining efficient at a local level so that programming overhead does not outweigh performance benefits.

Hardware management of barriers within a multi-threaded core allows for a decrease in programming overhead versus traditional methods. By providing one-time configurability and reuse through stores to addressable MSRs, multiple concurrent operations (each with unique barrier IDs) and push vs. poll configuration, embodiments may reduce the software overhead.

Embodiments may realize better performance as compared to a conventional software method of atomically incrementing and polling on a memory location. This is so, since as described herein, embodiments provide fast responses to polls and do not utilize a long latency memory location or occupy any cache/coherency bandwidth. Hardware performance bottlenecks are further addressed by tracking status local to each pipeline and at the core level. In this way, poll requests from the pipelines do not have to travel over the core network, preserving network bandwidth and saving multiple cycles of latency on the response to the poll. Embodiments may also easily scale with an increase of the number of pipelines within a core. Embodiments can also manage barriers with participant counts greater than the limit of hardware threads, allowing for over-subscription of the pipelines. When a barrier.init instruction is executed by a given hardware thread, a software and/or hardware mechanism can store any appropriate software and/or hardware state so that a new thread of execution is executed by the hardware thread. The new thread of execution may participate in the same barrier in which the previous thread of execution participated, hence achieving over-subscription. In embodiments the poll or push notification mechanisms allow detection of barrier completion and enable appropriate actions to continue the program execution. Embodiments may be used for applications such as graph analytics to realize a highly multi-threaded architecture.

In some embodiments, network bandwidth can further be saved by configuring local participating thread counts at each pipeline. In this way, the threads can be coalesced before a single message is sent over the network to the core collective engine. This can potentially reduce barrier.init instructions over the network, potentially substantially (e.g., a 16x reduction). In such implementation, the programmer may configure the MSRs at each PCE with a configured count. Further, in contrast to the base case, thread migration may not occur amongst pipelines in the core. If the programmer wants to oversubscribe a core with more threads than the hardware can support at a given point in time, the threads are put to sleep and woken up on a free hardware resource, which may be a different pipeline.

Note that with the hierarchical arrangement described herein, a core may be oversubscribed, and the only limitation to the number of threads within a core participating in a barrier is the capacity of the CONFIG_COUNT MSR.

As described above, hardware mechanisms for barrier synchronizations may be integrated within a processor or other SoC. Such processor may include processor cores that may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Figure 9A:
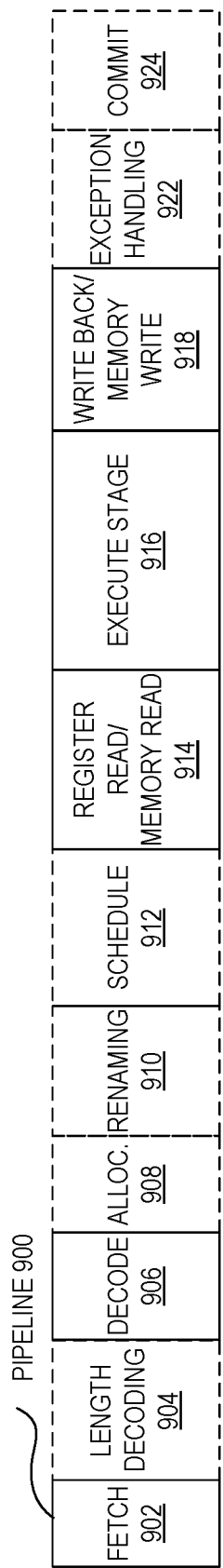
FIG. 9A is a block diagram illustrating both an exemplary in-order pipeline and an exemplary register renaming, out-of-order issue/execution pipeline according to embodiments of the invention.
Figure 9B:
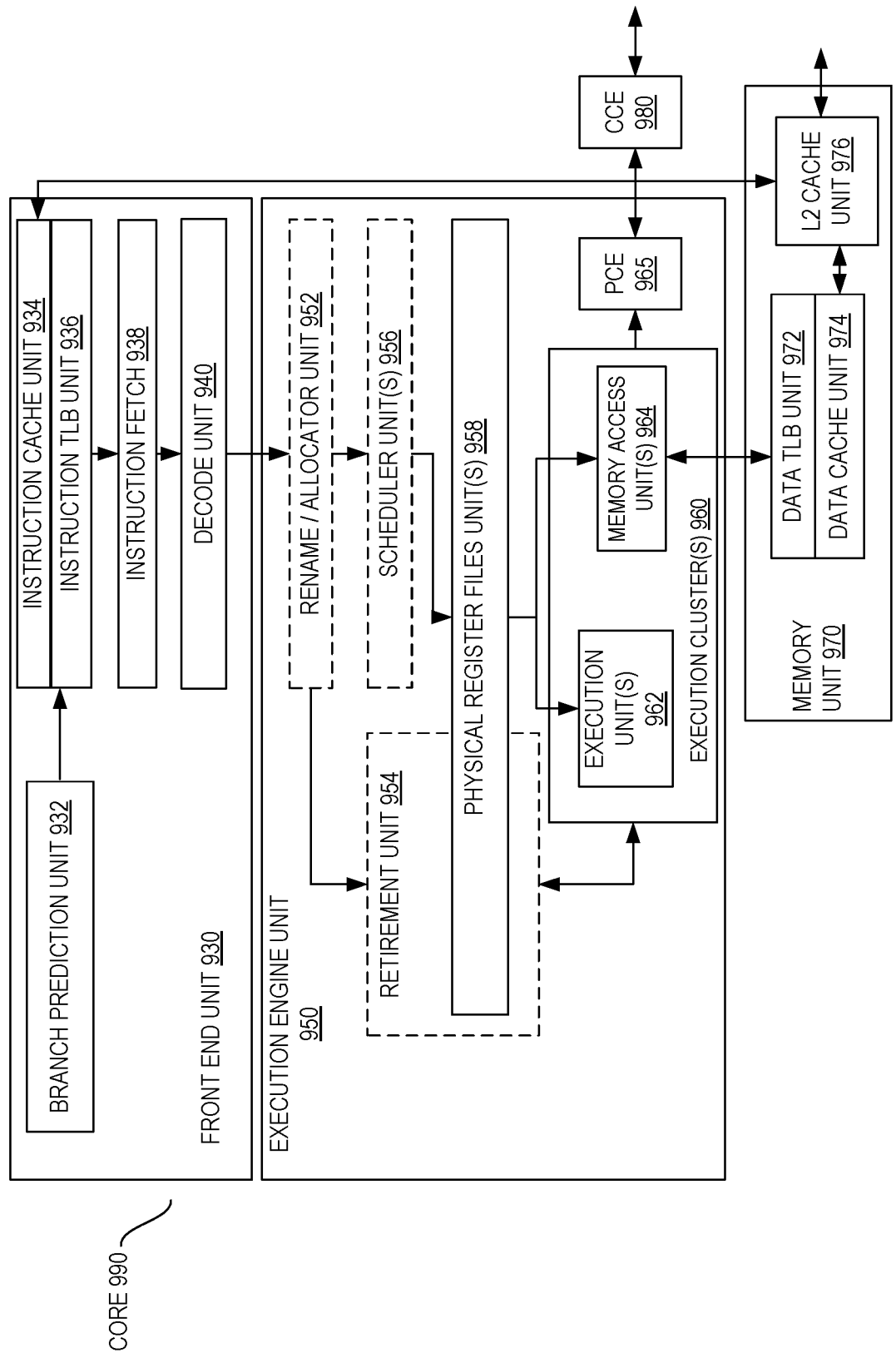
FIG. 9B is a block diagram illustrating both an exemplary embodiment of an in-order architecture core and an exemplary register renaming, out-of-order issue/execution architecture core to be included in a processor according to embodiments of the invention.

FIG. 9A is a block diagram illustrating both an exemplary in-order pipeline and an exemplary register renaming, out-of-order issue/execution pipeline according to embodiments of the invention. FIG. 9B is a block diagram illustrating both an exemplary embodiment of an in-order architecture core and an exemplary register renaming, out-of-order issue/execution architecture core to be included in a processor according to embodiments of the invention. The solid lined boxes in FIGS. 9A and 9B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 9A, a processor pipeline 900 includes a fetch stage 902, a length decode stage 904, a decode stage 906, an allocation stage 908, a renaming stage 910, a scheduling (also known as a dispatch or issue) stage 912, a register read/memory read stage 914, an execute stage 916, a write back/memory write stage 918, an exception handling stage 922, and a commit stage 924. Note that as described herein, in a given embodiment a core may include multiple processing pipelines such as pipeline 900, each of which may be coupled to a PCE as described herein.

FIG. 9B shows processor core 990 including a front end unit 930 coupled to an execution engine unit 950, and both are coupled to a memory unit 970. The core 990 may be a reduced instruction set computing (RISC) core, a complex instruction set computing (CISC) core, a very long instruction word (VLIW) core, or a hybrid or alternative core type. As yet another option, the core 990 may be a special-purpose core, such as, for example, a network or communication core, compression engine, coprocessor core, general purpose computing graphics processing unit (GPGPU) core, graphics core, or the like.

The front end unit 930 includes a branch prediction unit 932 coupled to an instruction cache unit 934, which is coupled to an instruction translation lookaside buffer (TLB) 936, which is coupled to an instruction fetch unit 938, which is coupled to a decode unit 940. The decode unit 940 (or decoder) may decode instructions, and generate as an output one or more micro-operations, micro-code entry points, microinstructions, other instructions, or other control signals, which are decoded from, or which otherwise reflect, or are derived from, the original instructions. The decode unit 940 may be implemented using various different mechanisms. Examples of suitable mechanisms include, but are not limited to, look-up tables, hardware implementations, programmable logic arrays (PLAs), microcode read only memories (ROMs), etc. In one embodiment, the core 990 includes a microcode ROM or other medium that stores microcode for certain macroinstructions (e.g., in decode unit 940 or otherwise within the front end unit 930). The decode unit 940 is coupled to a rename/allocator unit 952 in the execution engine unit 950.

The execution engine unit 950 includes the rename/allocator unit 952 coupled to a retirement unit 954 and a set of one or more scheduler unit(s) 956. The scheduler unit(s) 956 represents any number of different schedulers, including reservations stations, central instruction window, etc. The scheduler unit(s) 956 is coupled to the physical register file(s) unit(s) 958. Each of the physical register file(s) units 958 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 958 comprises a vector registers unit, a write mask registers unit, and a scalar registers unit. These register units may provide architectural vector registers, vector mask registers, and general purpose registers. The physical register file(s) unit(s) 958 is overlapped by the retirement unit 954 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 954 and the physical register file(s) unit(s) 958 are coupled to the execution cluster(s) 960. The execution cluster(s) 960 includes a set of one or more execution units 962 and a set of one or more memory access units 964. The execution units 962 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 956, physical register file(s) unit(s) 958, and execution cluster(s) 960 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 964). It should also be understood that where separate pipelines are used, one or more of these pipelines may be out-of-order issue/execution and the rest in-order.

The set of memory access units 964 is coupled to the memory unit 970, which includes a data TLB unit 972 coupled to a data cache unit 974 coupled to a level 2 (L2) cache unit 976. In one exemplary embodiment, the memory access units 964 may include a load unit, a store address unit, and a store data unit, each of which is coupled to the data TLB unit 972 in the memory unit 970. The instruction cache unit 934 is further coupled to a level 2 (L2) cache unit 976 in the memory unit 970. The L2 cache unit 976 is coupled to one or more other levels of cache and eventually to a main memory.

By way of example, the exemplary register renaming, out-of-order issue/execution core architecture may implement the pipeline 900 as follows: 1) the instruction fetch 938 performs the fetch and length decoding stages 902 and 904; 2) the decode unit 940 performs the decode stage 906; 3) the rename/allocator unit 952 performs the allocation stage 908 and renaming stage 910; 4) the scheduler unit(s) 956 performs the schedule stage 912; 5) the physical register file(s) unit(s) 958 and the memory unit 970 perform the register read/memory read stage 914; the execution cluster 960 perform the execute stage 916; 6) the memory unit 970 and the physical register file(s) unit(s) 958 perform the write back/memory write stage 918; 7) various units may be involved in the exception handling stage 922; and 8) the retirement unit 954 and the physical register file(s) unit(s) 958 perform the commit stage 924.

As further illustrated in FIG. 9B, a PCE 965 may couple to execution cluster(s) 960 to provide the thread-based status of barrier operations as described herein. In turn, PCE 965 couples to a CCE 980 that may further couple to additional PCEs associated with other pipelines of core 990, as well as to interface with other CCEs of other cores.

The core 990 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 990 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 934/974 and a shared L2 cache unit 976, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 10B:
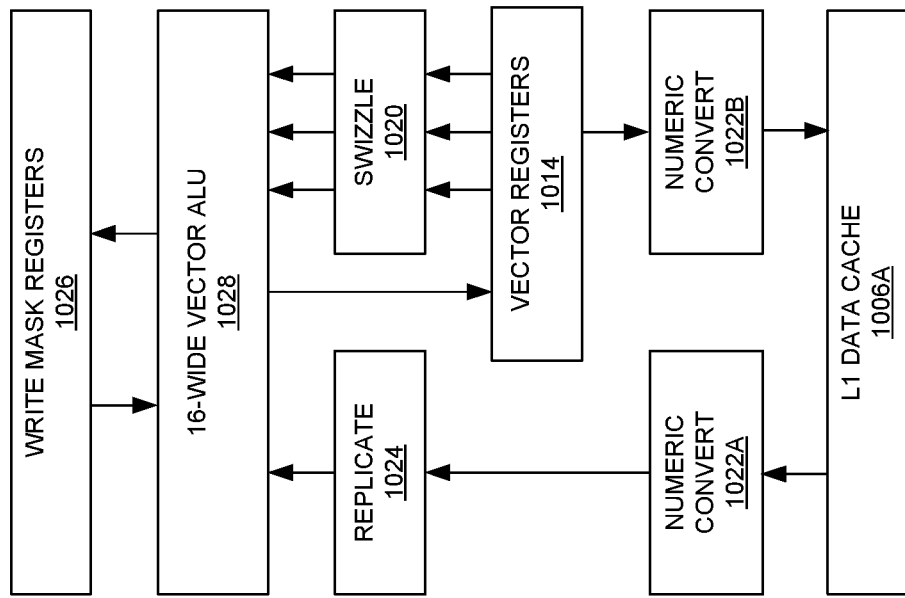
FIGS. 10A and 10B illustrate a block diagram of a more specific exemplary in-order core architecture, which core would be one of several logic blocks (including other cores of the same type and/or different types) in a chip.
Figure 10A:
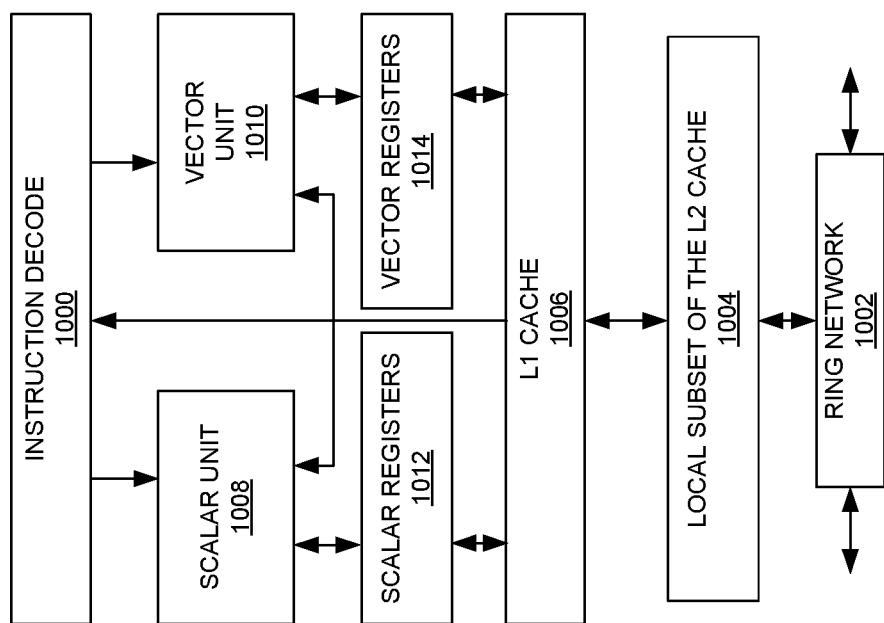

FIGS. 10A and 10B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 10A is a block diagram of a single processor core, along with its connection to the on-die interconnect network 1002 and with its local subset of the Level 2 (L2) cache 1004, according to embodiments of the invention. In one embodiment, an instruction decoder 1000 supports the x86 instruction set with a packed data instruction set extension. An L1 cache 1006 allows low-latency accesses to cache memory into the scalar and vector units. While in one embodiment (to simplify the design), a scalar unit 1008 and a vector unit 1010 use separate register sets (respectively, scalar registers 1012 and vector registers 1014) and data transferred between them is written to memory and then read back in from a level 1 (L1) cache 1006, alternative embodiments of the invention may use a different approach (e.g., use a single register set or include a communication path that allow data to be transferred between the two register files without being written and read back).

The local subset of the L2 cache 1004 is part of a global L2 cache that is divided into separate local subsets, one per processor core. Each processor core has a direct access path to its own local subset of the L2 cache 1004. Data read by a processor core is stored in its L2 cache subset 1004 and can be accessed quickly, in parallel with other processor cores accessing their own local L2 cache subsets. Data written by a processor core is stored in its own L2 cache subset 1004 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 10B is an expanded view of part of the processor core in FIG. 10A according to embodiments of the invention. FIG. 10B includes an L1 data cache 1006A part of the L1 cache 1004, as well as more detail regarding the vector unit 1010 and the vector registers 1314. Specifically, the vector unit 1010 is a 16-wide vector processing unit (VPU) (see the 16-wide ALU 1028), which executes one or more of integer, single-precision float, and double-precision float instructions. The VPU supports swizzling the register inputs with swizzle unit 1020, numeric conversion with numeric convert units 1022A-B, and replication with replication unit 1024 on the memory input. Write mask registers 1026 allow predicating resulting vector writes.

Figure 11:
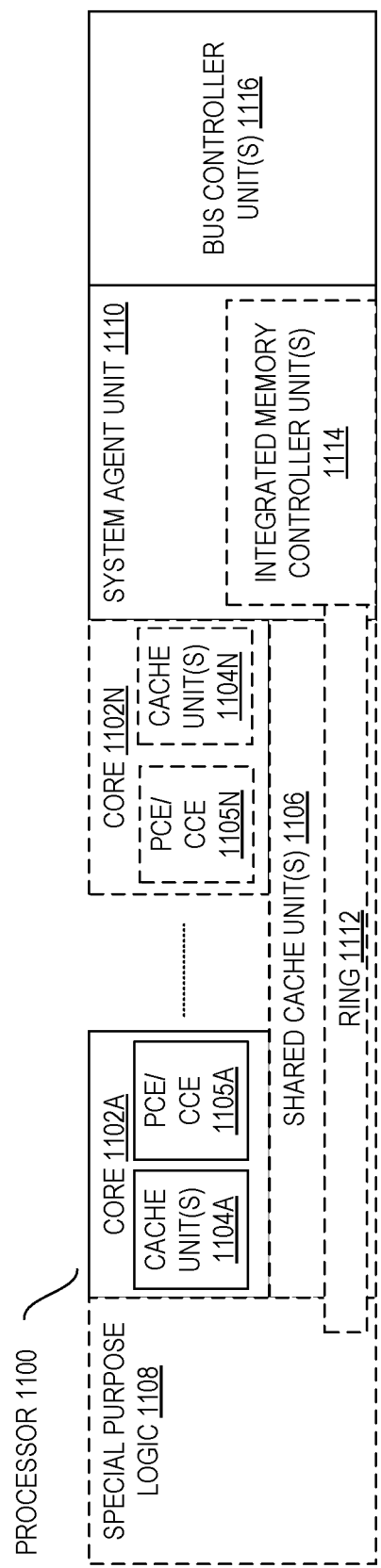
FIG. 11 is a block diagram of a processor that may have more than one core, may have an integrated memory controller, and may have integrated graphics according to embodiments of the invention.

FIG. 11 is a block diagram of a processor 1100 that may have more than one core, may have an integrated memory controller, and may have integrated graphics according to embodiments of the invention. The solid lined boxes in FIG. 11 illustrate a processor 1100 with a single core 1102A, a system agent 1110, a set of one or more bus controller units 1116, while the optional addition of the dashed lined boxes illustrates an alternative processor 1100 with multiple cores 1102A-N, a set of one or more integrated memory controller unit(s) in the system agent unit 1110, and special purpose logic 1108.

Thus, different implementations of the processor 1100 may include: 1) a CPU with the special purpose logic 1108 being integrated graphics and/or scientific (throughput) logic (which may include one or more cores), and the cores 1102A-N being one or more general purpose cores (e.g., general purpose in-order cores, general purpose out-of-order cores, a combination of the two); 2) a coprocessor with the cores 1102A-N being a large number of special purpose cores intended primarily for graphics and/or scientific (throughput); and 3) a coprocessor with the cores 1102A-N being a large number of general purpose in-order cores. Thus, the processor 1100 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1100 may be a part of and/or may be implemented on one or more substrates using any of a number of process technologies, such as, for example, BiCMOS, CMOS, or NMOS.

The memory hierarchy includes one or more levels of cache units 1104A-N within the cores, a set or one or more shared cache units 1106, and external memory (not shown) coupled to the set of integrated memory controller units 1114. The set of shared cache units 1106 may include one or more mid-level caches, such as level 2 (L2), level 3 (L3), level 4 (L4), or other levels of cache, a last level cache (LLC), and/or combinations thereof. While in one embodiment a ring based interconnect unit 1112 interconnects the special purpose logic 1108, the set of shared cache units 1106, and the system agent unit 1110/integrated memory controller unit(s) 1114, alternative embodiments may use any number of well-known techniques for interconnecting such units. In one embodiment, coherency is maintained between one or more cache units 1106 and cores 1102 A-N.

In some embodiments, one or more of the cores 1102A-N are capable of multi-threading. To this end, cores 1102A-N may include multiple corresponding PCEs and at least one CCE, illustrated collectively as PCEs/CCE 1105A-N in FIG. 11, to perform hardware management of barrier synchronization operations as described herein. The system agent unit 1110 includes those components coordinating and operating cores 1102A-N. The system agent unit 1110 may include for example a power control unit (PCU) and a display unit. The PCU may be or include logic and components needed for regulating the power state of the cores 1102A-N and the integrated graphics logic 1108. The display unit is for driving one or more externally connected displays.

The cores 1102A-N may be homogenous or heterogeneous in terms of architecture instruction set; that is, two or more of the cores 1102A-N may be capable of execution the same instruction set, while others may be capable of executing only a subset of that instruction set or a different instruction set.

FIGS. 12-15 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 12:
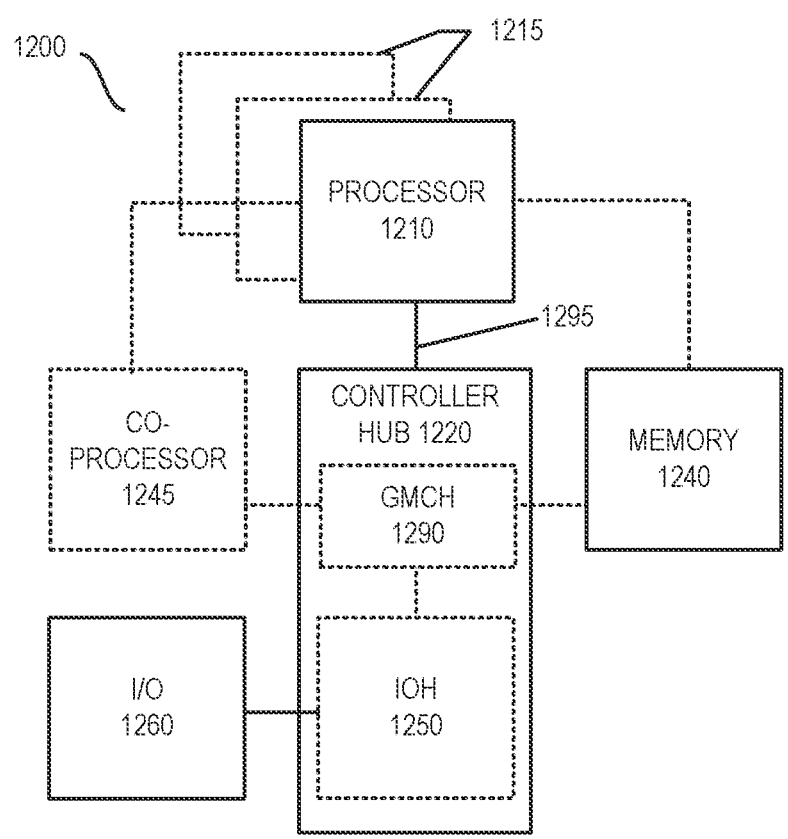
FIG. 12 is a block diagram of a system in accordance with one embodiment of the present invention.

Referring now to FIG. 12, shown is a block diagram of a system 1200 in accordance with one embodiment of the present invention. The system 1200 may include one or more processors 1210, 1215, which are coupled to a controller hub 1220. In one embodiment the controller hub 1220 includes a graphics memory controller hub (GMCH) 1290 and an Input/Output Hub (IOH) 1250 (which may be on separate chips); the GMCH 1290 includes a memory controller to control SRP operations within a coupled memory and a graphics controller to which are coupled memory 1240 and a coprocessor 1245; the IOH 1250 couples input/output (I/O) devices 1260 to the GMCH 1290. Alternatively, one or both of the memory and graphics controllers are integrated within the processor (as described herein), the memory 1240 and the coprocessor 1245 are coupled directly to the processor 1210, and the controller hub 1220 in a single chip with the IOH 1250.

The optional nature of additional processors 1215 is denoted in FIG. 12 with broken lines. Each processor 1210, 1215 may include one or more of the processing cores described herein and may be some version of the processor 1100.

The memory 1240 may be, for example, dynamic random access memory (DRAM), phase change memory (PCM), or a combination of the two. For at least one embodiment, the controller hub 1220 communicates with the processor(s) 1210, 1215 via a multi-drop bus, such as a frontside bus (FSB), point-to-point interface such as QuickPath Interconnect (QPI), or similar connection 1295.

In one embodiment, the coprocessor 1245 is a special-purpose processor, such as, for example, a high-throughput MIC processor, a network or communication processor, compression engine, graphics processor, GPGPU, embedded processor, or the like. In one embodiment, controller hub 1220 may include an integrated graphics accelerator.

There can be a variety of differences between the physical resources 1210, 1215 in terms of a spectrum of metrics of merit including architectural, microarchitectural, thermal, power consumption characteristics, and the like.

In one embodiment, the processor 1210 executes instructions that control data processing operations of a general type. Embedded within the instructions may be coprocessor instructions. The processor 1210 recognizes these coprocessor instructions as being of a type that should be executed by the attached coprocessor 1245. Accordingly, the processor 1210 issues these coprocessor instructions (or control signals representing coprocessor instructions) on a coprocessor bus or other interconnect, to coprocessor 1245. Coprocessor(s) 1245 accept and execute the received coprocessor instructions.

Figure 13:
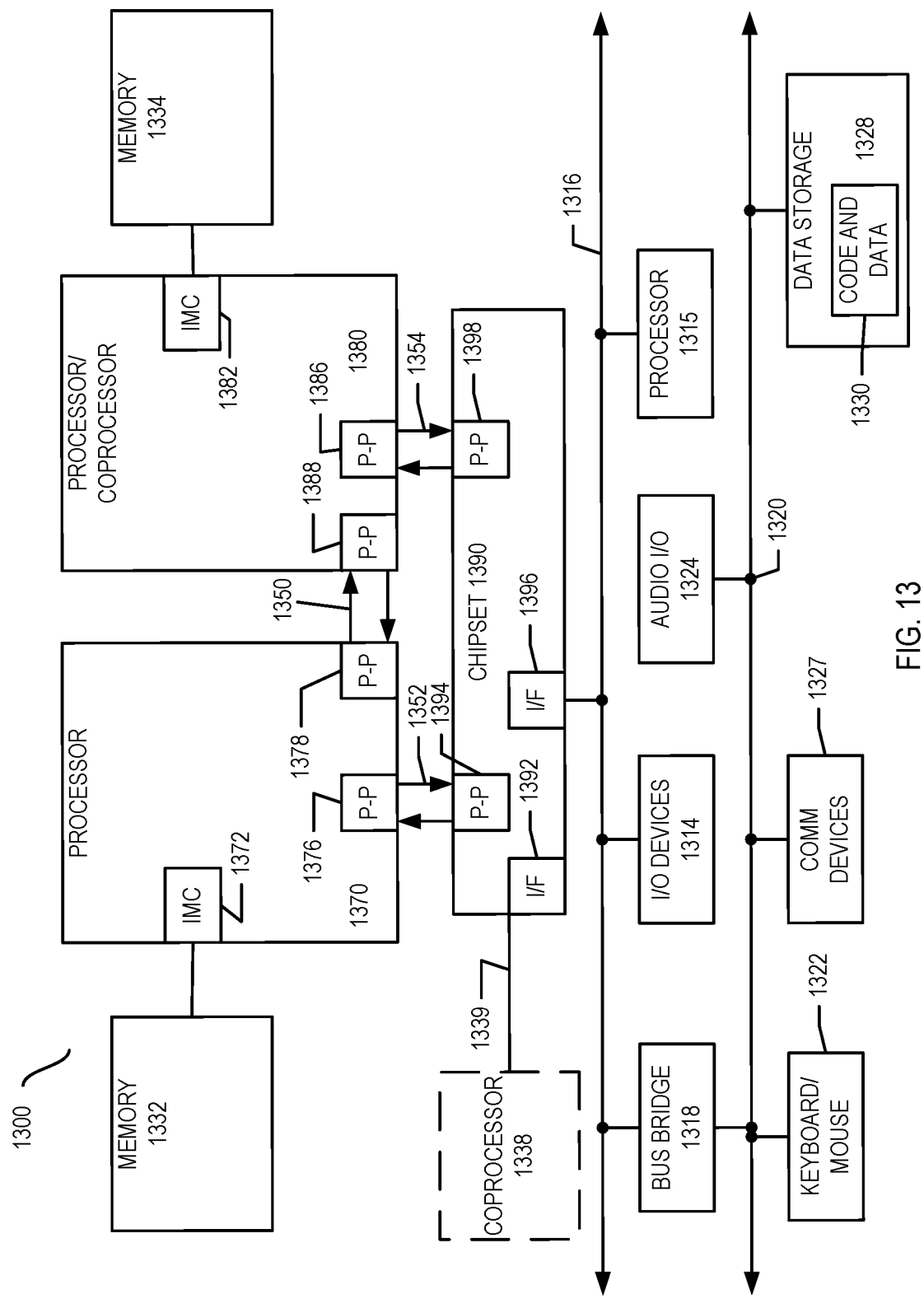
FIG. 13 is a block diagram of a first more specific exemplary system in accordance with an embodiment of the present invention.

Referring now to FIG. 13, shown is a block diagram of a first more specific exemplary system 1300 in accordance with an embodiment of the present invention. As shown in FIG. 13, multiprocessor system 1300 is a point-to-point interconnect system, and includes a first processor 1370 and a second processor 1380 coupled via a point-to-point interconnect 1350. Each of processors 1370 and 1380 may be some version of the processor 1100. In one embodiment of the invention, processors 1370 and 1380 are respectively processors 1210 and 1215, while coprocessor 1338 is coprocessor 1245. In another embodiment, processors 1370 and 1380 are respectively processor 1210 and coprocessor 1245.

Processors 1370 and 1380 are shown including integrated memory controller (IMC) units 1372 and 1382, respectively. Processor 1370 also includes as part of its bus controller units point-to-point (P-P) interfaces 1376 and 1378; similarly, second processor 1380 includes P-P interfaces 1386 and 1388. Processors 1370, 1380 may exchange information via a point-to-point (P-P) interface 1350 using P-P interface circuits 1378, 1388. As shown in FIG. 13, IMCs 1372 and 1382 couple the processors to respective memories, namely a memory 1332 and a memory 1334, which may be portions of main memory locally attached to the respective processors.

Processors 1370, 1380 may each exchange information with a chipset 1390 via individual P-P interfaces 1352, 1354 using point to point interface circuits 1376, 1394, 1386, 1398. Chipset 1390 may optionally exchange information with the coprocessor 1338 via a high-performance interface 1339. In one embodiment, the coprocessor 1338 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1390 may be coupled to a first bus 1316 via an interface 1396. In one embodiment, first bus 1316 may be a Peripheral Component Interconnect (PCI) bus, or a bus such as a PCI Express bus or another third generation I/O interconnect bus, although the scope of the present invention is not so limited.

As shown in FIG. 13, various I/O devices 1314 may be coupled to first bus 1316, along with a bus bridge 1318 which couples first bus 1316 to a second bus 1320. In one embodiment, one or more additional processor(s) 1315, such as coprocessors, high-throughput MIC processors, GPGPU's, accelerators (such as, e.g., graphics accelerators or digital signal processing (DSP) units), field programmable gate arrays, or any other processor, are coupled to first bus 1316. In one embodiment, second bus 1320 may be a low pin count (LPC) bus. Various devices may be coupled to a second bus 1320 including, for example, a keyboard and/or mouse 1322, communication devices 1327 and a storage unit 1328 such as a disk drive or other mass storage device which may include instructions/code and data 1330, in one embodiment. Further, an audio I/O 1324 may be coupled to the second bus 1320. Note that other architectures are possible. For example, instead of the point-to-point architecture of FIG. 13, a system may implement a multi-drop bus or other such architecture.

Figure 14:
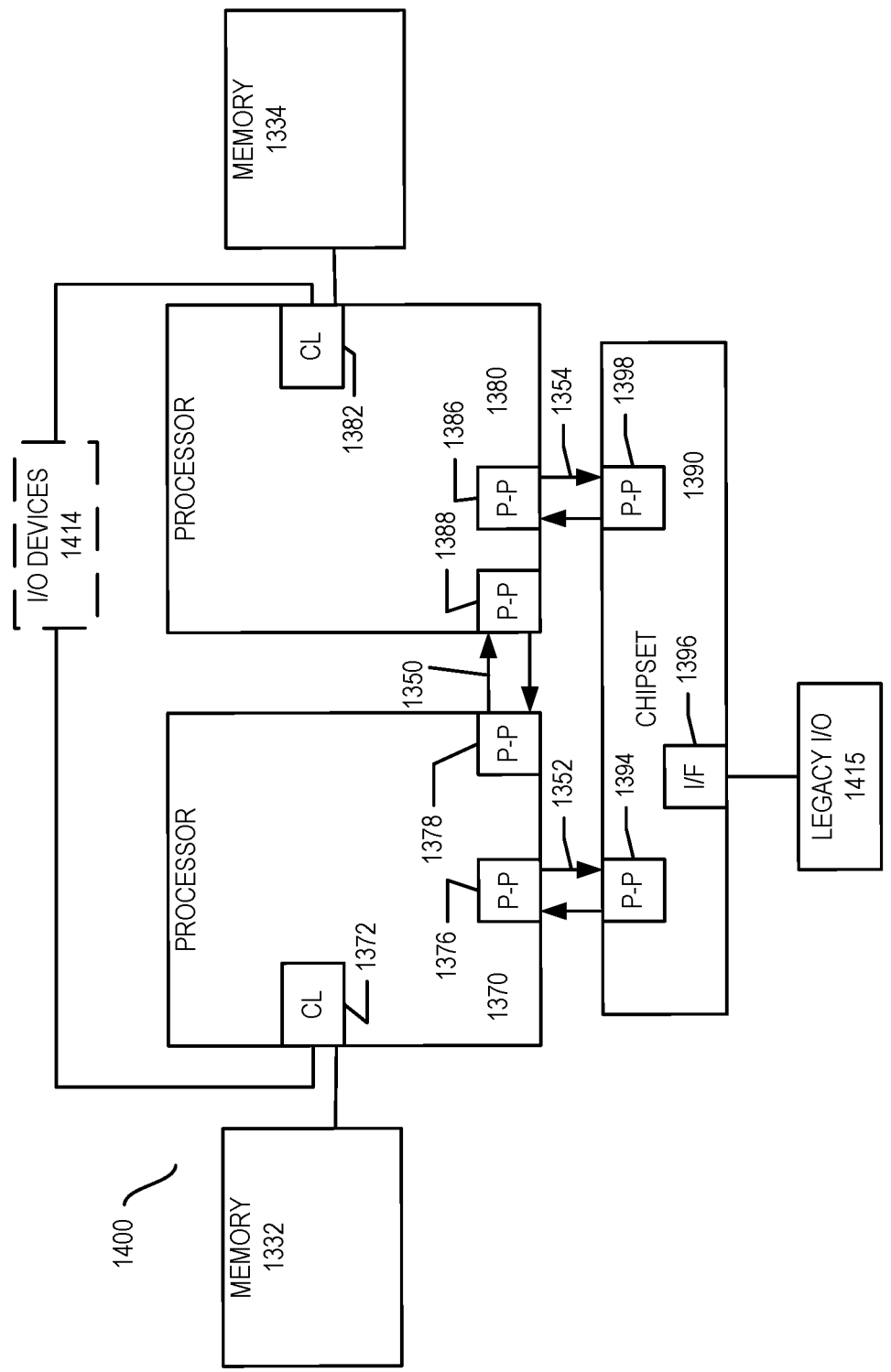
FIG. 14 is a block diagram of a second more specific exemplary system in accordance with an embodiment of the present invention.

Referring now to FIG. 14, shown is a block diagram of a second more specific exemplary system 1400 in accordance with an embodiment of the present invention. Like elements in FIGS. 13 and 14 bear like reference numerals, and certain aspects of FIG. 13 have been omitted from FIG. 14 in order to avoid obscuring other aspects of FIG. 14.

FIG. 14 illustrates that the processors 1370, 1380 may include integrated memory and I/O control logic ("CL") 1372 and 1382, respectively. Thus, the CL 1372, 1382 include integrated memory controller units and include I/O control logic. FIG. 14 illustrates that not only are the memories 1332, 1334 coupled to the CL 1372, 1382, but also that I/O devices 1414 are also coupled to the control logic 1372, 1382. Legacy I/O devices 1415 are coupled to the chipset 1390.

Figure 15:
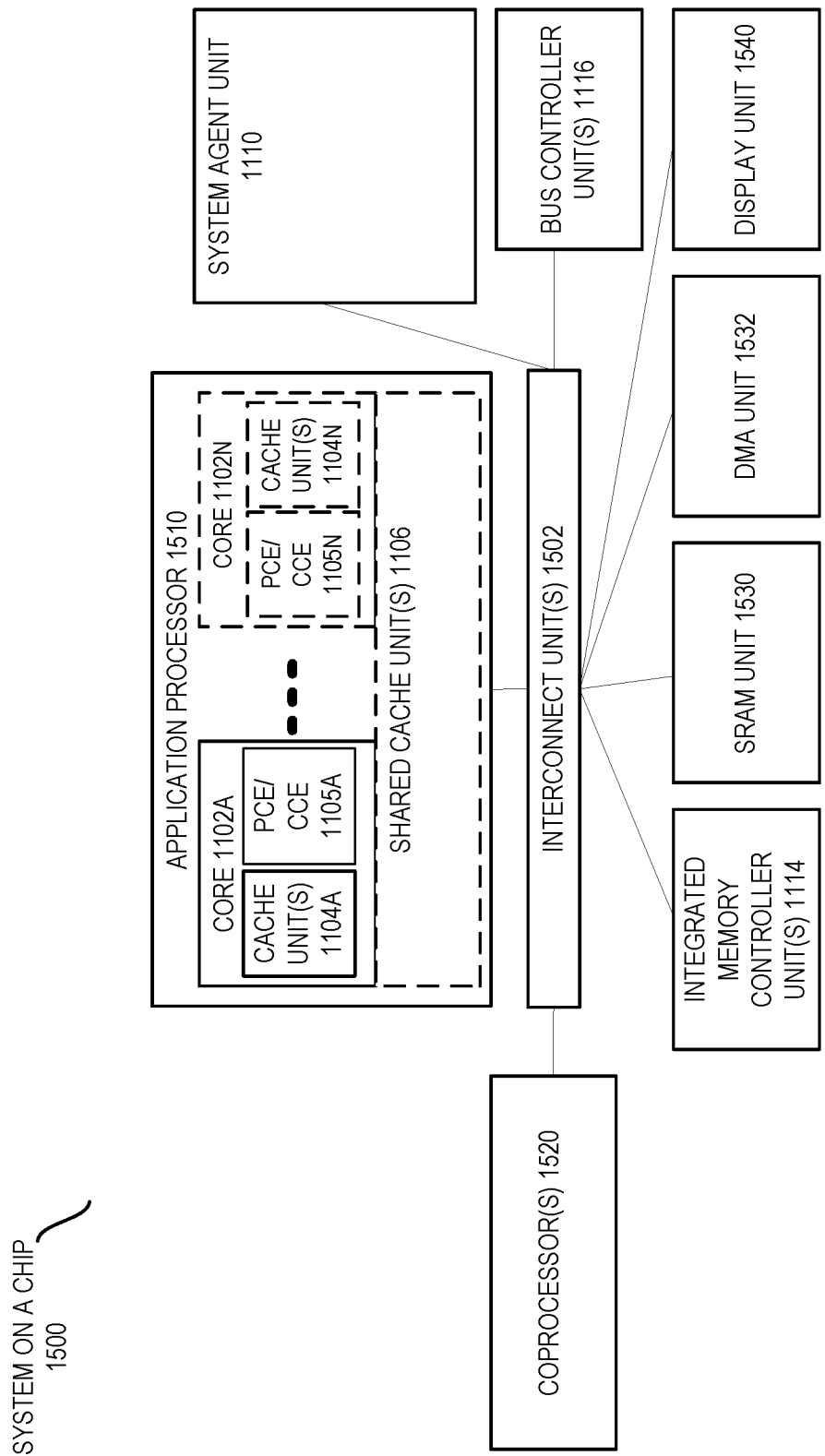
FIG. 15 is a block diagram of a SoC in accordance with an embodiment of the present invention.

Referring now to FIG. 15, shown is a block diagram of a SoC 1500 in accordance with an embodiment of the present invention. Similar elements in FIG. 11 bear like reference numerals. Also, dashed lined boxes are optional features on more advanced SoCs. In FIG. 15, an interconnect unit(s) 1502 is coupled to: an application processor 1510 which includes a set of one or more cores 1102A-N (including constituent cache units 1104A-N and PCEs/CCEs 1105A-N) and shared cache unit(s) 1106; a system agent unit 1110; a bus controller unit(s) 1116; an integrated memory controller unit(s) 1114; a set or one or more coprocessors 1520 which may include integrated graphics logic, an image processor, an audio processor, and a video processor; an static random access memory (SRAM) unit 1530; a direct memory access (DMA) unit 1532; and a display unit 1540 for coupling to one or more external displays. In one embodiment, the coprocessor(s) 1520 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1330 illustrated in FIG. 13, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 16:
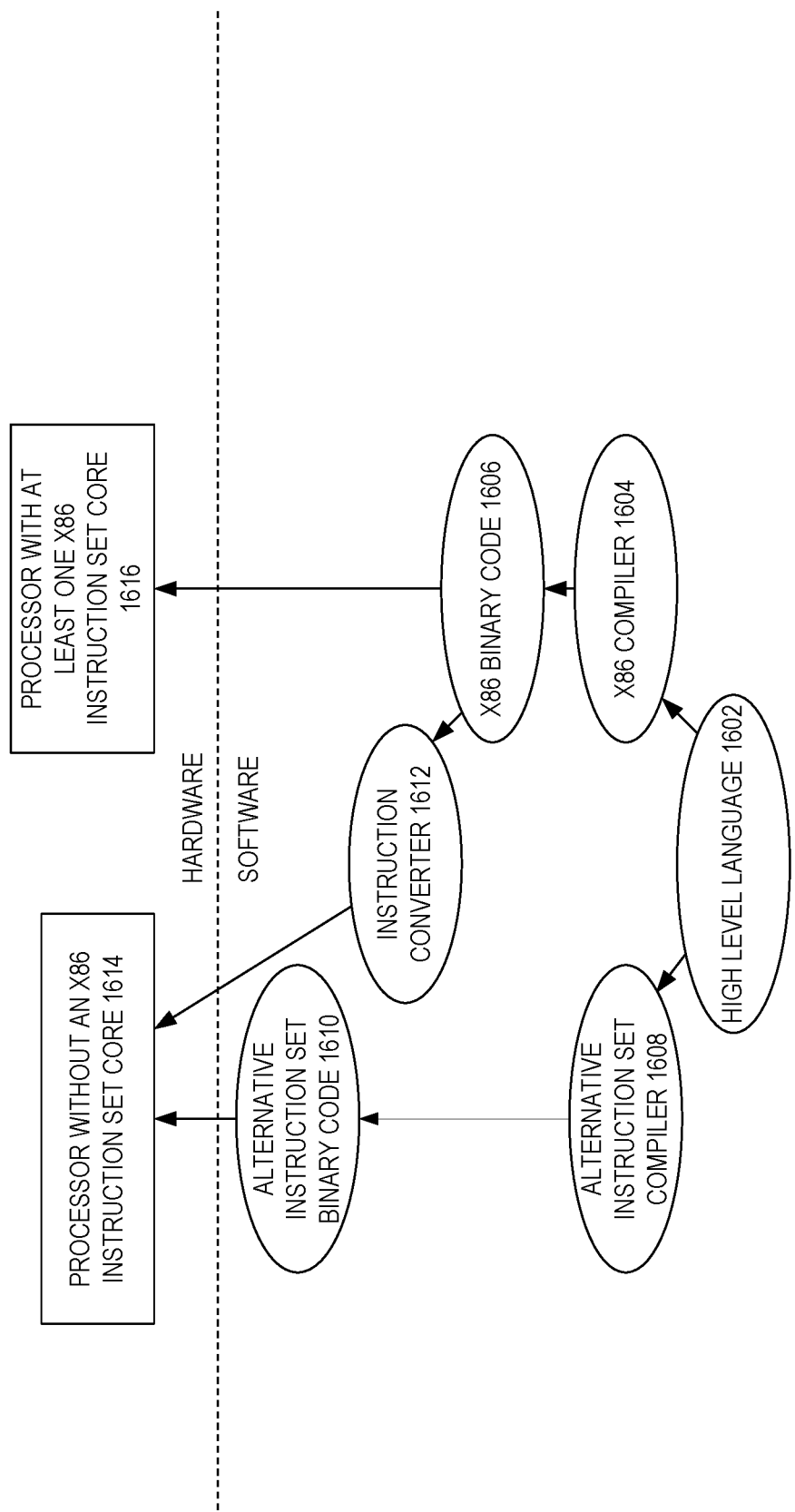
FIG. 16 is a block diagram contrasting the use of a software instruction converter to convert binary instructions in a source instruction set to binary instructions in a target instruction set according to embodiments of the invention.

FIG. 16 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 16 shows a program in a high level language 1602 may be compiled using an x86 compiler 1604 to generate x86 binary code 1606 that may be natively executed by a processor with at least one x86 instruction set core 1616. The processor with at least one x86 instruction set core 1616 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1604 represents a compiler that is operable to generate x86 binary code 1606 (e.g., object code) that can, with or without additional linkage processing, be executed on the processor with at least one x86 instruction set core 1616. Similarly, FIG. 16 shows the program in the high level language 1602 may be compiled using an alternative instruction set compiler 1608 to generate alternative instruction set binary code 1610 that may be natively executed by a processor without at least one x86 instruction set core 1614 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1612 is used to convert the x86 binary code 1606 into code that may be natively executed by the processor without an x86 instruction set core 1614. This converted code is not likely to be the same as the alternative instruction set binary code 1610 because an instruction converter capable of this is difficult to make; however, the converted code will accomplish the general operation and be made up of instructions from the alternative instruction set. Thus, the instruction converter 1612 represents software, firmware, hardware, or a combination thereof that, through emulation, simulation or any other process, allows a processor or other electronic device that does not have an x86 instruction set processor or core to execute the x86 binary code 1606.

The following examples pertain to further embodiments.

In one example, a processor includes a first core comprising: a plurality of execution pipelines each to execute instructions of one or more threads; a plurality of pipeline barrier circuits coupled to the plurality of execution pipelines, each of the plurality of pipeline barrier circuits associated with one of the plurality of execution pipelines to maintain status information for a plurality of barrier groups, each of the plurality of barrier groups formed of at least two threads; and a core barrier circuit to control operation of the plurality of pipeline barrier circuits and to inform the plurality of pipeline barrier circuits when a first barrier has been reached by a first barrier group of the plurality of barrier groups.

In an example, the processor further comprises a local network to couple the plurality of pipeline barrier circuits to the core barrier circuit.

In an example, the core barrier circuit is to receive a configuration message to program the plurality of pipeline barrier circuits for the first barrier group, the configuration message including a count of the at least two threads of the first barrier group.

In an example, a first thread of the at least two threads of the first barrier group is to reach the first barrier upon execution of a first barrier instruction, the first barrier instruction to cause the first thread to send a completion notification to the core barrier circuit.

In an example, the core barrier circuit is to update a first count associated with the first barrier group in response to the completion notification.

In an example, the core barrier circuit is to determine that the at least two threads of the first barrier group have reached the first barrier when the first count equals a configured value corresponding to a count of the at least two threads of the first barrier group.

In an example, in response to the determination that the at least two threads of the first barrier group have reached the first barrier, the core barrier circuit is to indicate to the plurality of pipeline barrier circuits that the first barrier group has reached a synchronization point.

In an example, in response to a second barrier instruction, the first thread is to poll a first pipeline barrier circuit of the plurality of pipeline barrier circuits to determine whether the first barrier group has reached the synchronization point.

In an example, the first thread, in response to a determination that the first barrier group has not reached the synchronization point, is to execute one or more instructions unassociated with the first barrier.

In an example, the core barrier circuit is coupled to a second core barrier circuit of a second core coupled to the first core, to enable the first barrier group to include at least one first thread to execute on the first core and at least one second thread to execute on the second core.

In an example, the core barrier circuit is to couple to a second core barrier circuit of a second core, to enable the first barrier group to include at least one first thread to execute on the first core and at least one second thread to execute on the second core, to enable a cross-socket barrier operation to occur, the second core included in a second processor socket, the first core included in a first processor socket.

In another example, a method comprises: receiving, in a core barrier circuit of a first core of a processor from a first pipeline barrier circuit of the first core, a barrier reach indication, the barrier reach indication to indicate that a first thread of a first barrier group having a plurality of threads has reached a first barrier; updating, via the core barrier circuit, an active count for the first barrier group based on the barrier reach indication; determining, in the core barrier circuit, whether the active count corresponds to a configured count for the first barrier group; and in response to determining that the active count corresponds to the configured count, informing the plurality of threads of the first barrier group that the first barrier has been reached by the plurality of threads.

In an example, informing the plurality of threads comprises sending a barrier completion indication to a plurality of pipeline barrier circuits including the first pipeline barrier circuit, where the plurality of pipeline barrier circuits are to inform the plurality of threads.

In an example, informing the plurality of threads comprises sending an interrupt to an interrupt controller to cause the interrupt controller to issue an interrupt to inform the plurality of threads.

In an example, the method further comprises receiving, in the core barrier circuit, a second barrier reach indication from a second pipeline barrier circuit of a second core of the processor, the second barrier reach indication to indicate that a second thread of the first barrier group has reached the first barrier, the second thread to execute on the second core.

In an example, the method further comprises receiving, in the core barrier circuit, a second barrier reach indication from a second pipeline barrier circuit of a first core of a second processor, the second barrier reach indication to indicate that a second thread of the first barrier group has reached the first barrier, the second thread to execute on the first core of the second processor, where a first processor socket comprises the processor and a second processor socket comprises the second processor.

In another example, a computer readable medium including instructions is to perform the method of any of the above examples.

In another example, a computer readable medium including data is to be used by at least one machine to fabricate at least one integrated circuit to perform the method of any one of the above examples.

In another example, an apparatus comprises means for performing the method of any one of the above examples.

In another example, a system comprises: a first processor having a plurality of first cores, each of the plurality of first cores comprising a plurality of execution pipelines and a hierarchical barrier circuit to monitor operation of a barrier group having a plurality of threads, the hierarchical barrier circuit comprising a first plurality of barrier circuits to provide synchronization status information to the plurality of execution pipelines and a second barrier circuit to provide the synchronization status information to the first plurality of barrier circuits; and a memory coupled to the first processor.

In an example, the system further comprises: a first processor socket comprising the first processor; and a second processor socket comprising a second processor, where the at least one of the plurality of threads of the barrier group are to execute on the second processor socket.

In an example, the second barrier circuit is to control operation of the first plurality of barrier circuits and to inform the first plurality of barrier circuits when a first barrier has been reached by the barrier group.

In an example, a first thread of the plurality of threads of the barrier group is to reach the first barrier upon execution of a first barrier instruction, the first barrier instruction to cause the first thread to send a completion notification to the second barrier circuit, where in response to the determination that the plurality of threads of the barrier group has reached the first barrier, the core barrier circuit is to indicate to the first plurality of barrier circuits that the barrier group has reached a synchronization point, and in response to a second barrier instruction, the first thread is to poll a first barrier circuit of the first plurality of barrier circuits to determine whether the barrier group has reached the synchronization point.

Understand that various combinations of the above examples are possible.

Note that the terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component. Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:
1. A processor comprising:
a first core comprising:
a plurality of execution pipelines each to execute instructions of one or more threads;
a plurality of pipeline barrier circuits coupled to the plurality of execution pipelines, each of the plurality of pipeline barrier circuits associated with one of the plurality of execution pipelines to maintain status information for a plurality of barrier groups, each of the plurality of barrier groups formed of at least two threads; and
a core barrier circuit to:
configure each pipeline barrier circuit of the plurality of pipeline barrier circuits into multiple collective configurations, wherein each of the multiple collective configurations is associated with a different barrier group of the plurality of barrier groups, and wherein each pipeline barrier circuit uses the multiple collective configurations concurrently to track the plurality of barrier groups;
receive, from a first pipeline barrier circuit of the plurality of pipeline barrier circuits, a barrier reach indication indicating that a first thread of a first barrier group having a plurality of threads has reached a first barrier;
in response to the received barrier reach indication, update an active count for the first barrier group based on the barrier reach indication; and
in response to a determination that the active count corresponds to a configured count, send a barrier completion indication to each of the plurality of pipeline barrier circuits.

2. The processor of claim 1, the first core further comprising a local network to couple the plurality of pipeline barrier circuits to the core barrier circuit.

3. The processor of claim 1, wherein the core barrier circuit is to receive a configuration message to program the plurality of pipeline barrier circuits for the first barrier group, the configuration message including a count of the at least two threads of the first barrier group.

4. The processor of claim 3, wherein the first thread of the first barrier group is to reach the first barrier upon execution of a first barrier instruction, the first barrier instruction to cause the first thread to send the barrier reach indication to the first pipeline barrier circuit.

5. The processor of claim 1, wherein the core barrier circuit is to determine that the at least two threads of the first barrier group have reached the first barrier when the active count equals a configured value corresponding to a count of the at least two threads of the first barrier group.

6. The processor of claim 4, wherein in response to a second barrier instruction, the first thread is to poll the first pipeline barrier circuit of the plurality of pipeline barrier circuits to determine whether the first barrier group has reached a synchronization point.

7. The processor of claim 1, wherein the first thread, in response to a determination that the first barrier group has not reached a synchronization point, is to execute one or more instructions unassociated with the first barrier.

8. The processor of claim 1, wherein the core barrier circuit is coupled to a second core barrier circuit of a second core coupled to the first core, to enable the first barrier group to include at least one thread to execute on the first core and at least one other thread to execute on the second core.

9. The processor of claim 1, wherein the core barrier circuit is to couple to a second core barrier circuit of a second core, to enable the first barrier group to include at least one thread to execute on the first core and at least one other thread to execute on the second core, to enable a cross-socket barrier operation to occur, the second core included in a second processor socket, the first core included in a first processor socket.

10. At least non-transitory one computer readable storage medium having stored thereon instructions, which if performed by a machine cause the machine to perform a method comprising:
tracking, in a core barrier circuit and a plurality of pipeline barrier circuits of a first core of a processor, a plurality of barrier groups associated with a plurality of execution pipelines of the first core, each of the plurality of barrier groups formed of at least two threads;
configuring, by the core barrier circuit, each pipeline barrier circuit of the plurality of pipeline barrier circuits into multiple collective configurations, wherein each of the multiple collective configurations is associated with a different barrier group of the plurality of barrier groups, and wherein each pipeline barrier circuit uses the multiple collective configurations concurrently to track the plurality of barrier groups;

receiving, in the core barrier circuit from a first pipeline barrier circuit of the plurality of pipeline barrier circuits in the first core, a barrier reach indication indicating that a first thread of a first barrier group having a plurality of threads has reached a first barrier, wherein the first thread is executed on a first pipeline associated with the first pipeline barrier circuit;

updating, via the core barrier circuit, an active count for the first barrier group based on the barrier reach indication;

determining, in the core barrier circuit, whether the active count corresponds to a configured count for the first barrier group; and in response to determining that the active count corresponds to the configured count, the core barrier circuit sending a barrier completion indication to each of the plurality of pipeline barrier circuits including the first pipeline barrier circuit.

11. The at least non-transitory one computer readable storage medium of claim 10, wherein, in response to receiving the barrier completion indication, the plurality of pipeline barrier circuits are to inform the plurality of threads of the first barrier group that the first barrier has been reached by the plurality of threads.

12. The at least one non-transitory computer readable storage medium of claim 11, wherein informing the plurality of threads comprises sending an interrupt to an interrupt controller to cause the interrupt controller to issue an interrupt to inform the plurality of threads.

13. The at least one non-transitory computer readable storage medium of claim 10, wherein the method further comprises receiving, in the core barrier circuit, a second barrier reach indication from a second pipeline barrier circuit of a second core of the processor, the second barrier reach indication to indicate that a second thread of the first barrier group has reached the first barrier, the second thread to execute on the second core.

14. The at least one non-transitory computer readable storage medium of claim 10, wherein the method further comprises receiving, in the core barrier circuit, a second barrier reach indication from a second pipeline barrier circuit of a first core of a second processor, the second barrier reach indication to indicate that a second thread of the first barrier group has reached the first barrier, the second thread to execute on the first core of the second processor, wherein a first processor socket comprises the processor and a second processor socket comprises the second processor.

15. A system comprising:
a first processor having a plurality of first cores, each of the plurality of first cores comprising a plurality of execution pipelines and a hierarchical barrier circuit to monitor operation of a plurality of barrier groups, each barrier group having a plurality of threads, the hierarchical barrier circuit comprising:
a plurality of pipeline barrier circuits to provide synchronization status information to the plurality of execution pipelines; and
a core barrier circuit to:
configure each pipeline barrier circuit of the plurality of pipeline barrier circuits into multiple collective configurations, wherein each of the multiple collective configurations is associated with a different barrier group of the plurality of barrier groups, and wherein each pipeline barrier circuit uses the multiple collective configurations concurrently to track the plurality of barrier groups;
receive, from a first pipeline barrier circuit of the plurality of pipeline barrier circuits, a barrier reach indication indicating that a first thread of a first barrier group having a plurality of threads has reached a first barrier;
in response to the received barrier reach indication, update an active count for the first barrier group based on the barrier reach indication; and
in response to a determination that the active count corresponds to a configured count, send a barrier completion indication to each of the plurality of barrier circuits; and
a memory coupled to the first processor.

16. The system of claim 15, further comprising:
a first processor socket comprising the first processor; and
a second processor socket comprising a second processor, wherein the at least one of the plurality of threads of the barrier group are to execute on the second processor socket.

17. The system of claim 15, wherein each of the plurality of first cores comprises a local network to couple the plurality of pipeline barrier circuits to the core barrier circuit.

18. The system of claim 17, wherein the core barrier circuit is to receive a configuration message to program the plurality of pipeline barrier circuits for the first barrier group, the configuration message including a count of the at least two threads of the first barrier group.

* * * * *

UNITED STATES PATENT AND TRADEMARK OFFICE
CERTIFICATE OF CORRECTION

| | | |
|---|---|---|
| PATENT NO. | : 11,061,742 B2 | Page 1 of 1 |
| APPLICATION NO. | : 16/019685 | |
| DATED | : July 13, 2021 | |
| INVENTOR(S) | : Robert Pawlowski et al. | |

It is certified that error appears in the above-identified patent and that said Letters Patent is hereby corrected as shown below:

In the Specification

Column 1, Line 5, insert:
--GOVERNMENT INTEREST
This invention was made with Government support under Agreement No. HR0011-17-3-0004, awarded by DARPA. The Government has certain rights in the invention.--

Signed and Sealed this
Fourteenth Day of February, 2023

*Katherine Kelly Vidal*

Katherine Kelly Vidal
*Director of the United States Patent and Trademark Office*